(12) United States Patent
Li

(10) Patent No.: US 12,370,408 B2
(45) Date of Patent: Jul. 29, 2025

(54) RECOMMENDATION METHOD BASED ON EXERCISE STATUS OF USER AND ELECTRONIC DEVICE

(71) Applicant: Huawei Technologies Co., Ltd., Shenzhen (CN)

(72) Inventor: Bo Li, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 541 days.

(21) Appl. No.: 17/421,495

(22) PCT Filed: Dec. 11, 2019

(86) PCT No.: PCT/CN2019/124483
§ 371 (c)(1),
(2) Date: Jul. 8, 2021

(87) PCT Pub. No.: WO2020/151387
PCT Pub. Date: Jul. 30, 2020

(65) Prior Publication Data
US 2022/0080261 A1 Mar. 17, 2022

(30) Foreign Application Priority Data

Jan. 23, 2019 (CN) ........................ 201910062730.7

(51) Int. Cl.
*A63B 24/00* (2006.01)
*A63B 71/06* (2006.01)
(Continued)

(52) U.S. Cl.
CPC ...... *A63B 24/0062* (2013.01); *A63B 24/0006* (2013.01); *A63B 71/0622* (2013.01);
(Continued)

(58) Field of Classification Search
CPC .................................................. A63B 24/0062
(Continued)

(56) References Cited

U.S. PATENT DOCUMENTS 9,529,520 B2    12/2016   Cha et al.
2006/0136173 A1  6/2006   Case, Jr. et al.
(Continued)

FOREIGN PATENT DOCUMENTS

CN    102772211 A    11/2012
CN    103870529 A    6/2014
(Continued)

OTHER PUBLICATIONS

ITU-T H.264, "Series H: Audiovisual and Multimedia Systems, Infrastructure of audiovisual services-Coding of moving video, Advanced video coding for generic audiovisual services," Apr. 2017, 812 pages.

*Primary Examiner* — Muluemebet Gurmu
(74) *Attorney, Agent, or Firm* — Conley Rose, P.C.

(57) ABSTRACT

A recommendation method based on an exercise status of a user includes an electronic device obtaining first exercise data of a user after running an exercise application. The first exercise data is used to reflect a type of exercise that is being performed by the user. The method further includes the electronic device determining a first exercise scenario corresponding to the first exercise data. The method further includes the electronic device obtaining first recommended content corresponding to the first exercise scenario. The method further includes the electronic device displaying the first recommended content in a display interface of the exercise application, or the electronic device playing the first recommended content when running the exercise application.

19 Claims, 15 Drawing Sheets

(51) Int. Cl.
*G06F 3/0488* (2022.01)
*G06F 16/9535* (2019.01)

(52) U.S. Cl.
CPC ........ *G06F 3/0488* (2013.01); *G06F 16/9535* (2019.01); *A63B 2024/0009* (2013.01); *A63B 2024/0065* (2013.01); *A63B 2024/0068* (2013.01); *A63B 2220/70* (2013.01)

(58) Field of Classification Search
USPC ........................................................ 707/732
See application file for complete search history.

(56) References Cited

U.S. PATENT DOCUMENTS

| | | | | |
|---|---|---|---|---|
| 2008/0033581 A1* | 2/2008 | Doshi | ................... | A63B 71/06 |
| | | | | 700/92 |
| 2013/0316316 A1* | 11/2013 | Flavell | .................. | G16H 20/30 |
| | | | | 434/247 |
| 2014/0172910 A1 | 6/2014 | Jung et al. | | |
| 2015/0296273 A1* | 10/2015 | Kim | ................... | H04N 21/4781 |
| | | | | 725/32 |
| 2016/0291837 A1 | 10/2016 | Chen et al. | | |
| 2017/0153809 A1* | 6/2017 | Yang | ................... | G06F 3/04883 |
| 2018/0132780 A1* | 5/2018 | Saar | ...................... | G11B 27/031 |
| 2018/0164761 A1* | 6/2018 | Kulkarni | ................ | G05B 15/02 |
| 2018/0361203 A1* | 12/2018 | Wang | ..................... | G06N 20/00 |
| 2020/0261769 A1* | 8/2020 | Seppänen | ............ | A61B 5/0205 |
| 2021/0255826 A1* | 8/2021 | Devine | ................... | G06F 3/167 |

FOREIGN PATENT DOCUMENTS

| | | |
|---|---|---|
| CN | 105148461 A | 12/2015 |
| CN | 105487656 A | 4/2016 |
| CN | 106844660 A | 6/2017 |
| CN | 106951068 A | 7/2017 |
| CN | 107430472 A | 12/2017 |
| CN | 107562867 A | 1/2018 |
| CN | 107595257 A | 1/2018 |
| CN | 107707927 A | 2/2018 |
| CN | 109829107 A | 5/2019 |
| EP | 3893129 A1 | 11/2019 |
| JP | 4423241 B2 | 3/2010 |
| WO | 9741925 A1 | 11/1997 |
| WO | 2015085599 A1 | 6/2015 |
| WO | 2017113154 A1 | 7/2017 |

\* cited by examiner

RECOMMENDATION METHOD BASED ON EXERCISE STATUS OF USER AND ELECTRONIC DEVICE

This application is a national stage of International Patent Application No. PCT/CN2019/124483 filed on Dec. 11, 2019, which claims priority to Chinese Patent Application No. 201910062730.7 filed on Jan. 23, 2019. Both of the aforementioned applications are hereby incorporated by reference in their entireties.

TECHNICAL FIELD

This application relates to the field of terminal technologies, and in particular, to a recommendation method based on an exercise status of a user and an electronic device.

BACKGROUND

Currently, many users install exercise applications (application, APP), for example, Codoon or Huawei Health, on terminals such as mobile phones. During exercise, a user may use the foregoing exercise app to collect and view exercise information of the user, such as an exercise step count, an exercise speed, exercise duration, and an exercise distance.

In addition to viewing the foregoing exercise information in the exercise app, the user during exercise can also use functions provided by other applications to enhance exercise experience. For example, when running, the user may listen to a song by using a music app, or view a weather condition by using a weather app. It can be learned that functions that need to be provided by the mobile phone for the user during exercise are generally distributed in different display interfaces of different applications. Therefore, the user needs to manually perform searching and switching in each display interface during exercise. This easily causes interference to an exercise process, and reduces user experience.

SUMMARY

This application provides a recommendation method based on an exercise status of a user and an electronic device, so that exercise-related service content can be provided for a user when an exercise app is run, to reduce a quantity of times that the user switches between display interfaces, and improve exercise experience of the user.

To achieve the foregoing objectives, the following technical solutions are used in this application.

According to a first aspect, this application provides a recommendation method based on an exercise status of a user, including: An electronic device obtains first exercise data of the user after running an exercise application, where the first exercise data is used to reflect a type of exercise that is being performed by the user; the electronic device may determine a first exercise scenario corresponding to the first exercise data; the electronic device may obtain first recommended content corresponding to the first exercise scenario; and when running the exercise application, the electronic device may display the first recommended content in a display interface of the exercise application, or the electronic device may play the first recommended content through a voice. In this way, in a process of completing exercise by using the exercise app, the user may directly enjoy, in the exercise app, recommended content that is related to the current exercise and that is provided by another application or service. The user does not need to repeatedly switch between different apps or different display interfaces to search for content required by the user during the exercise process. This improves exercise experience of the user when using the exercise app.

In a possible design method, that the electronic device determines a first exercise scenario corresponding to the first exercise data specifically includes: The electronic device determines the exercise type corresponding to the first exercise data, and determines the exercise type as the first exercise scenario. In other words, the type of exercise that is being performed by the user is the first exercise scenario.

Alternatively, before that the electronic device determines a first exercise scenario corresponding to the first exercise data, the method further includes: The electronic device obtains current first environment data, where the first environment data is used to reflect an environment feature during exercise of the user; and that the electronic device determines a first exercise scenario corresponding to the first exercise data specifically includes: The electronic device determines the first exercise scenario corresponding to the first exercise data and the first environment data. In other words, the electronic device may determine the corresponding first exercise scenario based on the current exercise type of the user and an environment factor. When the user performs different exercises in different scenarios, the electronic device may determine a corresponding exercise scenario by obtaining corresponding exercise data and environment data.

In a possible design method, the electronic device may store a correspondence between different exercise scenarios and different recommended content, and that the electronic device obtains first recommended content corresponding to the first exercise scenario specifically includes: The electronic device queries the first recommended content corresponding to the first exercise scenario in the correspondence. In this way, in different exercise scenarios, the electronic device may determine, for the user, recommended content that is related to the current exercise scenario, and recommend the recommended content to the user.

In a possible design method, the first recommended content is determined by the electronic device based on a historical use habit of the user in the first exercise scenario. In this case, in a same exercise scenario, recommended content determined by the electronic device for different users is related to historical behavior habits of the users, so that personalized and customized recommended content is provided for the users during exercise.

in a possible design method, that the electronic device displays the first recommended content in a display interface of the exercise application includes: The electronic device displays detailed information of the first recommended content in the display interface of the exercise application, in other words, the electronic device provides a recommendation function of direct service in the exercise application, to reduce a quantity of times of jumping and switching between different interfaces when the user is in exercise; or the electronic device displays a shortcut of the first recommended content in the display interface of the exercise application. The user may trigger, through the shortcut of the first recommended content, the electronic device to play or display the specific first recommended content.

For example, after that the electronic device displays a shortcut of the first recommended content in the display interface of the exercise application, the method may further include: If detecting that the user selects the shortcut of the first recommended content, the electronic device displays or
} plays the detailed information of the first recommended content in the display interface of the exercise application.

In a possible design method, that the electronic device plays the first recommended content when running the exercise application specifically includes: When running the exercise application, if receiving a preset gesture entered by the user, the electronic device may start to play the first recommended content. In other words, the electronic device may be preset to trigger, in a trigger manner, for example, tapping the device, shaking the device, or lifting a hand, the electronic device to play the recommended content.

In a possible design method, before that the electronic device displays the first recommended content in a display interface of the exercise application, or before that the electronic device plays the first recommended content when running the exercise application, the method may further include: The electronic device may choose, based on the first exercise scenario, to display the first recommended content or play the first recommended content. In this way, the electronic device may select, based on features of different exercise scenarios, an appropriate manner to recommend the recommended content determined by the electronic device to the user, to improve exercise experience of the user.

In a possible design method, the method further includes: The electronic device may obtain second exercise data of the user when running the exercise application, and determine a second exercise scenario corresponding to the second exercise data (the second exercise scenario is different from the first exercise scenario); and the electronic device may obtain second recommended content corresponding to the second exercise scenario, and display the second recommended content in the display interface of the exercise application, or play the second recommended content when running the exercise application (the second recommended content is different from the first recommended content). In other words, all recommended content recommended by the electronic device to the user when running the exercise app is related to the current exercise scenario of the user. When the user performs different exercises, the electronic device may recommend, to the user, different recommended content related to the exercise scenario.

For example, the first recommended content or the second recommended content may include one or more of an audio file, a video file, fitness and health information, or environment information.

According to a second aspect, this application provides an electronic device, including one or more sensors, one or more processors, one or more memories, and one or more computer programs. The processor is coupled to the sensor, a touchscreen, and the memory. The one or more computer programs are stored in the memory. When the electronic device runs, the processor executes the one or more computer programs stored in the memory, so that the electronic device performs any one of the foregoing recommendation methods based on the exercise status of the user.

According to a third aspect, this application provides a graphical user interface (graphical user interface, GUI). The graphical user interface is stored in the foregoing electronic device, the electronic device includes a touchscreen, a memory, and a processor. The processor is configured to execute one or more computer programs stored in the memory. The graphical user interface may include: a first GUI displayed on the touchscreen when the electronic device is in a first exercise scenario, where the first GUI is a first display interface of an exercise application, and the first display interface includes first recommended content corresponding to the first exercise scenario; and a second GUI displayed on the touchscreen when the electronic device is in a second exercise scenario, where the second GUI is a second display interface of an exercise application, and the second display interface includes second recommended content corresponding to the second exercise scenario, where the second exercise scenario is different from the first exercise scenario, and the second recommended content is different from the first recommended content.

For example, the first recommended content in the first GUI is determined by the electronic device based on a historical use habit of a user in the first exercise scenario; and/or the second recommended content in the second GUI is determined by the electronic device based on a historical use habit of the user in the second exercise scenario.

According to a fourth aspect, this application provides a computer storage medium, including computer instructions. When the computer instructions are run on an electronic device, the electronic device is enabled to perform the recommendation method based on an exercise status of a user in any one of the possible design methods of the first aspect.

According to a fifth aspect, this application provides a computer program product. When the computer program product runs on an electronic device, the electronic device is enabled to perform the recommendation method based on an exercise status of a user in any one of the possible design methods of the first aspect.

It may be understood that the electronic device according to the second aspect, the GUI according to the third aspect, the computer storage medium according to the fourth aspect, and the computer program product according to the fifth aspect that are provided above are all configured to perform the corresponding method provided above. Therefore, for beneficial effects that can be achieved, refer to the beneficial effects in the corresponding method provided above. Details are not described herein again.

DESCRIPTION OF EMBODIMENTS

The following describes implementations of the embodiments in detail with reference to the accompanying drawings.

An embodiment of this application provides a recommendation method based on an exercise status of a user. The method may be applied to a mobile phone, a tablet computer, a notebook computer, an ultra-mobile personal computer (ultra-mobile personal computer, UMPC), a handheld computer, a netbook, a personal digital assistant (personal digital assistant, PDA), a wearable electronic device, a virtual reality device, or the like. This is not limited in the embodiments of this application.

Figure 1:
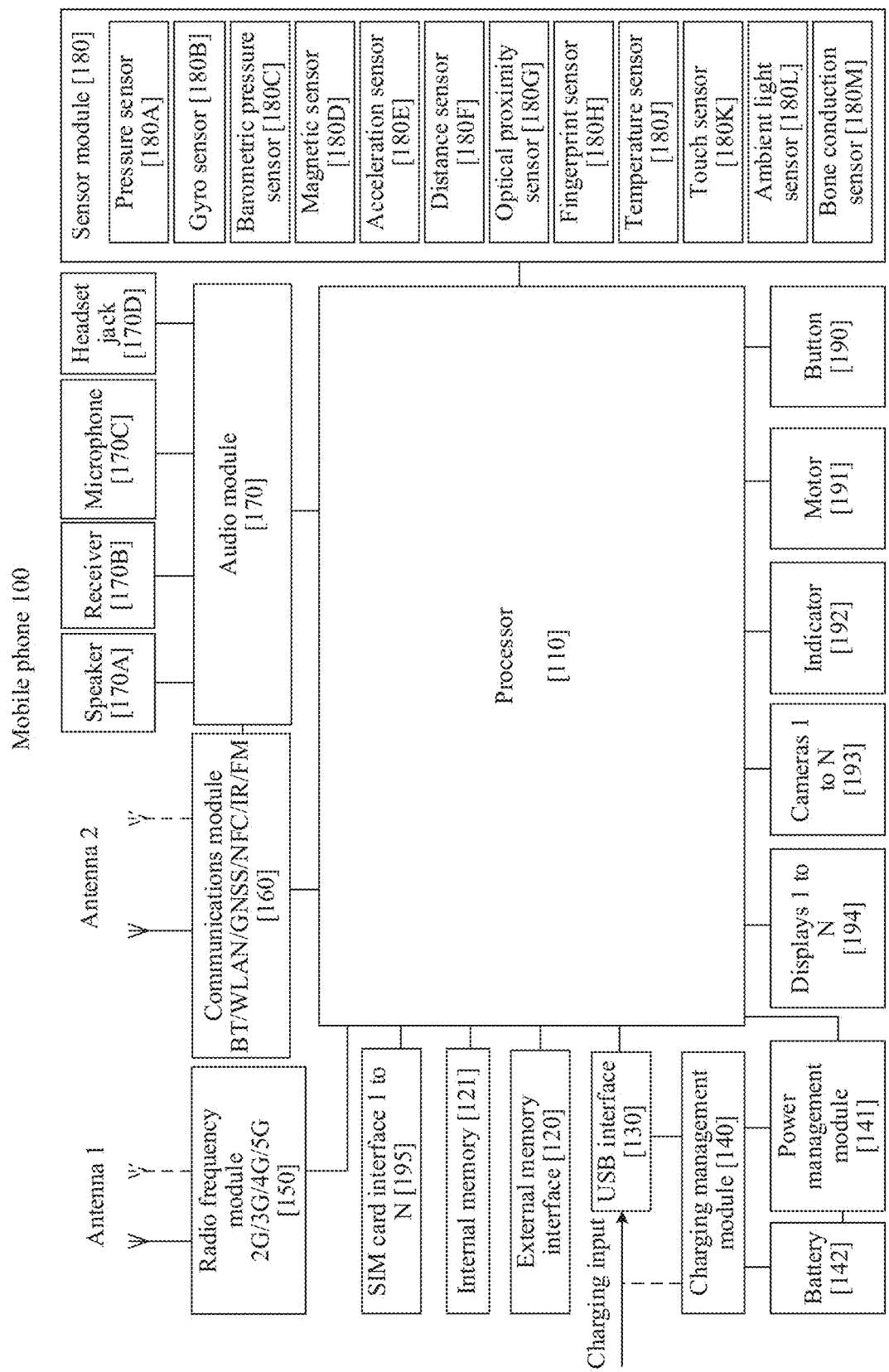
FIG. 1 is a schematic structural diagram 1 of an electronic device according to an embodiment of this application.

For example, a mobile phone 100 is the foregoing electronic device. FIG. 1 is a schematic structural diagram of the mobile phone.

The mobile phone 100 may include a processor 110, an external memory interface 120, an internal memory 121, a universal serial bus (universal serial bus, USB) interface 130, a charging management module 140, a power management module 141, a battery 142, an antenna 1, an antenna 2, a radio frequency module 150, a communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180I, a touch sensor 180K, an ambient light sensor 180L, a bone conduction sensor 180M, and the like.

It may be understood that the structure shown in this embodiment of this application does not constitute a specific limitation on the mobile phone 100. In some other embodiments of this application, the mobile phone 100 may include more or fewer components than those shown in FIG. 1, combine some components, split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the mobile phone 100. The controller may generate an operation control signal based on instruction operation code and a time sequence signal, to complete control of instruction reading and instruction execution.

A memory may be further disposed in the processor 110, and is configured to store an instruction and data. In some embodiments, the memory in the processor 110 is a high-speed cache memory. The memory may store an instruction or data just used or cyclically used by the processor 110. If the processor 110 needs to use the instruction or the data again, the processor 110 may directly invoke the instruction or the data from the memory. This avoids repeated access, reduces a waiting time period of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (derail clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the mobile phone 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the communications module 160 through the I2S interface, to implement a function of answering a call by using a Bluetooth headset.

The PCM interface may also be configured to: perform audio communication, and sample, quantize, and code an analog signal. In some embodiments, the audio module 170 may be coupled to the communications module 160 through a PCM bus interface. In some embodiments, the audio module 170 may also transmit an audio signal to the communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 110 and the communications module 160. For example, the processor 110 communicates with a Bluetooth module in the communications module 160 through the UART interface, to implement a Bluetooth function. In some embodiments, the audio module 170 may transmit an audio signal to the communications module 160 through the UART interface, to implement a function of playing music by using a Bluetooth headset.

The MIPI interface may be configured to connect the processor 110 to a peripheral component, for example, the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the mobile phone 100. The processor 110 communicates with the display 194 through the DSI interface, to implement a display function of the mobile phone 100.

The GPIO interface may be configured through software. The GPIO interface may be configured as a control signal or a data signal. In some embodiments, the GPIO interface may be configured to connect the processor 110 and the camera 193, the display 194, the communications module 160, the audio module 170, the sensor module 180, or the like. The GPIO interface may alternatively be configured as the I2C interface, the I2S interface, the UART interface, the MIPI interface, or the like.

The USB interface 130 is an interface that conforms to a USB standard specification, and may be specifically a mini USB interface, a micro USB interface, a USB Type-C interface, or the like. The USB interface 130 may be configured to connect to a charger to charge the mobile phone 100, or may be configured to transmit data between the mobile phone 100 and a peripheral device, or may be configured to connect to a headset to play audio by using the headset. The interface may alternatively be configured to connect to another electronic device, for example, an AR device.

It may be understood that an interface connection relationship between the modules illustrated in the embodiments of this application is merely an example for description, and does not constitute a limitation on a structure of the mobile phone 100. In some other embodiments of this application, the mobile phone 100 may alternatively use an interface connection manner different from that in the foregoing embodiments, or use a combination of a plurality of interface connection manners.

The charging management module 140 is configured to receive charging input from the charger. The charger may be a wireless charger or a wired charger. In some embodiments of wired charging, the charging management module 140 may receive charging input from the wired charger through the USB interface 130. In some embodiments of wireless charging, the charging management module 140 may receive wireless charging input by using a wireless charging coil of the mobile phone 100. The charging management module 140 supplies power for the electronic device by using the power management module 141 while charging the battery 142.

The power management module 141 is configured to connect the battery 142 and the charging management module 140 to the processor 110. The power management module 141 receives input of the battery 142 and/or the charging management module 140, and supplies power to the processor 110, the internal memory 121, an external memory, the display 194, the camera 193, the communications module 160, and the like. The power management module 141 may be further configured to monitor parameters such as a battery capacity, a quantity of battery cycles, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the mobile phone 100 may be implemented by using the antenna 1, the antenna 2, the radio frequency module 150, the communications module 160, the modem processor, the baseband processor, and the like.

The antenna 1 and the antenna 2 are configured to: transmit and receive electromagnetic wave signals. Each antenna in the mobile phone 100 may be configured to cover one or more communication bands. Different antennas may be further multiplexed to improve antenna utilization. For example, the antenna 1 may be multiplexed as a diversity antenna in a wireless local area network. In some other embodiments, an antenna may be used in combination with a tuning switch.

The radio frequency module 150 may provide a wireless communication solution that is applied to the mobile phone 100 and that includes 2G/3G/4G/5G. The radio frequency module 150 may include at least one filter, a switch, a power amplifier, a low noise amplifier (low noise amplifier, LNA), and the like. The radio frequency module 150 may receive an electromagnetic wave by using the antenna 1, perform processing such as filtering or amplification on the received electromagnetic wave, and transfer the electromagnetic wave to the modem processor for demodulation. The radio frequency module 150 may further amplify a signal modulated by the modem processor, and convert the signal into an electromagnetic wave for radiation by using the antenna 1. In some embodiments, at least some function modules in the radio frequency module 150 may be disposed in the processor 110. In some embodiments, at least some function modules in the radio frequency module 150 may be disposed in a same device as at least some modules in the processor 110.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband. processor for processing. The low-frequency baseband signal is processed by the baseband processor, and then transmitted to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same component as the radio frequency module 150 or another function module.

The communications module 160 may provide a wireless communication solution that is applied to the mobile phone 100 and that include a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, or an infrared (infrared, IR) technology. The communications module 160 may be one or more devices integrating at least one communications processor module. The communications module 160 receives an electromagnetic wave by using the antenna 2, performs frequency modulation and filtering processing on an electromagnetic wave signal, and sends a processed signal to the processor 110. The communications module 160 may further receive a to-be-sent signal from the processor 110, perform frequency modulation and amplification on the signal, and convert the signal into an electromagnetic wave for radiation by using the antenna 2.

In some embodiments, the antenna 1 of the mobile phone 100 is coupled to the radio frequency module 150, and the antenna 2 is coupled to the communications module 160, so that the mobile phone 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a. GNSS, a WLAN, NFC, FM, an IR technology, and/or the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or a satellite based augmentation system (satellite based augmentation systems, SBAS).

The mobile phone 100 implements a display function by using the GPU, the display 194, the application processor, and the like. The GPU is a microprocessor for image processing, and connects the display 194 to the application processor. The GPU is configured to: perform mathematical and geometric calculation, and render an image. The processor 110 may include one or more GPUs that execute a program instruction to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), flexible light-emitting diode (flex light-emitting diode, FLED), a mini LED, a micro LED, a micro OLED, a quantum dot light emitting diode (quantum dot light emitting diodes, QLED), or the like. In some embodiments, the mobile phone 100 may include one or N displays 194, where N is a positive integer greater than 1.

The mobile phone 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, luminance, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some embodiments, the mobile phone 100 may include one or N cameras 193, where N is a positive integer greater than 1.

The digital signal processor is configured to process a digital signal, and may process another digital signal in addition to the digital image signal. For example, when the mobile phone 100 selects a frequency, the digital signal processor is configured to perform Fourier transform on frequency energy, and the like.

The video codec is configured to: compress or decompress a digital video. The mobile phone 100 may support one or more video codecs. In this way, the mobile phone 100 can play or record videos in a plurality of coding formats, for example, moving picture experts group (moving picture experts group, MPEG)-1, MPEG-2, MPEG-3. and MPEG-4.

The NPU is a neural-network (neural-network, NN) computing processor, quickly processes input information by referring to a structure of a biological neural network, for example, by referring to a transfer mode between human brain neurons, and may further continuously perform self-learning. Applications such as intelligent cognition of the mobile phone 100, such as image recognition, facial recognition, speech recognition, and text understanding, can be implemented by using the NPU.

The external memory interface 120 may be configured to connect to an external storage card such as a micro SD card, to extend a storage capability of the mobile phone 100. The external storage card communicates with the processor 110 through the external memory interface 120, to implement a data storage function. For example, files such as music and a video are stored in the external storage card.

The internal memory 121 may be configured to store computer-executable program code. The executable program code includes an instruction. The processor 110 runs the instruction stored in the internal memory 121, to implement various function applications of the mobile phone 100 and data processing. The internal memory 121 may include a program storage area and a data storage area. The program storage area may store an operating system, an application required by at least one function (for example, a sound playing function or an image playing function), and the like. The data storage area may store data (for example, audio data or an address book) created during use of the mobile phone 100, and the like. In addition, the internal memory 121 may include a high-speed random access memory, and may further include a nonvolatile memory, for example, at least one magnetic disk storage device, a flash memory device, or a universal flash storage (universal flash storage, UFS).

The mobile phone 100 may implement an audio function, for example, music playing and recording, through the audio module 170, the speaker 170A, the receiver 170B, the microphone 170A, the headset jack 170D, the application processor, and the like.

The audio module 170 is configured to convert digital audio information into an analog audio signal for output, and is also configured to convert analog audio input into a digital audio signal. The audio module 170 may be further configured to: code and decode an audio signal. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The mobile phone 100 may listen to music by using the speaker 170A, or listen to a hands-free call.

The receiver 170B, also referred to as an "earpiece", is configured to convert an audio electrical signal into a sound signal. When a call is answered or voice information is received by using the mobile phone 100, the receiver 170B may be put close to a human ear to listen to a voice.

The microphone 170C, also referred to as a "mike" or a "microphone", is configured to convert a sound signal into an electrical signal. When making a call or sending voice information, a user may make a sound by moving a human mouth close to the microphone 170C to input a sound signal to the microphone 170C. At least one microphone 170C may be disposed in the mobile phone 100. In some other embodiments, two microphones 170C may be disposed in the mobile phone 100, to collect a sound signal and further implement a noise reduction function. In some other embodiments, three, four, or more microphones 170C may alternatively be disposed in the mobile phone 100, to collect a sound signal, reduce noise, further identify a sound source, implement a directional recording function, and the like.

The headset jack 170D is configured to connect to a wired headset. The headset jack 170D may be a USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, for example, a resistive pressure sensor, an inductive pressure sensor, a capacitive pressure sensor. The capacitive pressure sensor may include at least two parallel plates made of conductive materials. When a force is applied to the pressure sensor 180A, capacitance between electrodes changes. The mobile phone 100 determines pressure intensity based on the change of the capacitance. When a touch operation is performed on the display 194, the mobile phone 100 detects intensity of the touch operation by using the pressure sensor 180A. The mobile phone 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on a Messages icon, an instruction for creating a new SMS message is executed.

The gyro sensor 180B may be configured to determine a moving posture of the mobile phone 100. In some embodiments, an angular velocity of the mobile phone 100 around three axes (namely, x, y, and z axes) may be determined by using the gyro sensor 180B. The gyro sensor 180B may be configured to perform image stabilization during photographing. For example, when a shutter is pressed, the gyro sensor 180B detects an angle at which the mobile phone 100 jitters, obtains, through calculation based on the angle, a distance for which a lens module needs to compensate, and allows a lens to cancel the jitter of the mobile phone 100 through reverse exercise, to implement image stabilization. The gyro sensor 180B may be further used in navigation and motion sensing game scenarios.

The barometric pressure sensor 180C is configured to measure barometric pressure. In some embodiments, the mobile phone 100 calculates an altitude by using the barometric pressure measured by the barometric pressure sensor 180C, to assist in positioning and navigation.

The magnetic sensor 180D includes a Hall sensor. The mobile phone 100 may detect opening and closing of a flip leather case by using the magnetic sensor 180D. In some embodiments, when the mobile phone 100 is a clamshell phone, the mobile phone 100 may detect opening/closing of a flip cover based on the magnetic sensor 180D. Further, a feature such as automatic unlocking of the flip cover is set based on a detected opening/closing state of the leather case or a detected opening/closing state of the flip cover.

The acceleration sensor 180E may detect values of acceleration in various directions (usually on three axes) of the mobile phone 100. When the mobile phone 100 is still, a value and a direction of gravity may be detected. The acceleration sensor 180E may be further configured to identify a posture of the electronic device, and is applied to applications such as landscape/portrait orientation switching and a pedometer.

The distance sensor 180E is configured to measure a distance. The mobile phone 100 may measure a distance through infrared light or a laser. In some embodiments, in a photographing scenario, the mobile phone 100 may measure a distance by using the distance sensor 180F, to implement fast focusing.

The optical proximity sensor 180E may include a light-emitting diode (LED) and an optical detector, for example, a photodiode. The light-emitting diode may be an infrared light-emitting diode. The mobile phone 100 emits infrared light by using the light-emitting diode. The mobile phone 100 detects infrared reflected light from a nearby object by using the photodiode. When sufficient reflected light is detected, the mobile phone 100 may determine that there is an object near the mobile phone 100. When insufficient reflected light is detected, the mobile phone 100 may determine that there is no object near the mobile phone 100. The mobile phone 100 may detect, by using the optical proximity sensor 180G, that the user holds the mobile phone 100 close to an ear to make a call, so as to automatically turn off a screen for power saving. The optical proximity sensor 180G may also be used in a leather case mode or a pocket mode to automatically unlock or lock the screen.

The ambient light sensor 180L is configured to sense ambient light intensity. The mobile phone 100 may adaptively adjust luminance of the display 194 based on the sensed ambient light intensity. The ambient light sensor 180L may also be configured to automatically adjust white balance during photographing. The ambient light sensor 180L may also cooperate with the optical proximity sensor 180G to detect whether the mobile phone 100 is in a pocket to prevent an accidental touch.

The fingerprint sensor 180H is configured to collect a fingerprint. The mobile phone 100 may use a feature of the collected fingerprint to implement fingerprint unlocking, application access locking, fingerprint photographing, fingerprint call answering, and the like.

The temperature sensor 180J is configured to detect a temperature. In some embodiments, the mobile phone 100 executes a temperature processing policy based on the temperature detected by the temperature sensor 180J. For example, when the temperature reported by the temperature sensor 180J exceeds a threshold, the mobile phone 100 lowers performance of a processor near the temperature sensor 180J, to reduce power consumption for thermal protection. In some other embodiments, when the temperature is less than another threshold, the mobile phone 100 heats the battery 142 to prevent the mobile phone 100 from being shut down abnormally because of a low temperature. In some other embodiments, when the temperature is less than still another threshold, the mobile phone 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. Visual output related to the touch operation may be provided by using the display 194. In some other embodiments, the touch sensor 180K may alternatively be disposed on a surface of the mobile phone 100 and is at a location different from that of the display 194.

The bone conduction sensor 180M may obtain a vibration signal. In some embodiments, the bone conduction sensor 180M may obtain a vibration signal of a vibration bone of a human vocal part. The bone conduction sensor 180M may also be in contact with a human pulse, and receive a blood pressure beating signal. In some embodiments, the bone conduction sensor 180M may alternatively be disposed in the headset to form a bone conduction headset. The audio module 170 may obtain a voice signal through parsing based on the vibration signal that is of the vibration bone of the vocal part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The key 190 may be a mechanical button or a touch button. The mobile phone 100 receives button input, and generates button signal input related to a user setting and function control of the mobile phone 100.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or plugged from the SIM card interface 195, to implement contact with or separation from the mobile phone 100. The mobile phone 100 may support one or N SIM card interfaces, where N is a positive integer greater than 1. The SIM card interface 195 may support a nano SIM card, a micro SIM card, a SIM card, and the like. A plurality of cards may be simultaneously inserted into a same SIM card interface 195. The plurality of cards may be of a same type or of different types. The SIM card interface 195 may also be compatible with different types of SIM cards. The SIM card interface 195 may also be compatible with an external storage card. The mobile phone 100 interacts with a network by using the SIM card, to implement functions such as calling and data communication. In some embodiments, the mobile phone 100 uses an eSIM, namely, an embedded SIM card. The eSIM card may be embedded in the mobile phone 100, and cannot be separated from the mobile phone 100.

A software system of the mobile phone 100 may use a layered architecture, an event-driven architecture, a microkernel architecture, a microservice architecture, or a cloud architecture. In this embodiment of this application, an Android system with the layered architecture is used as an example to describe a software structure of the mobile phone 100.

Figure 2:
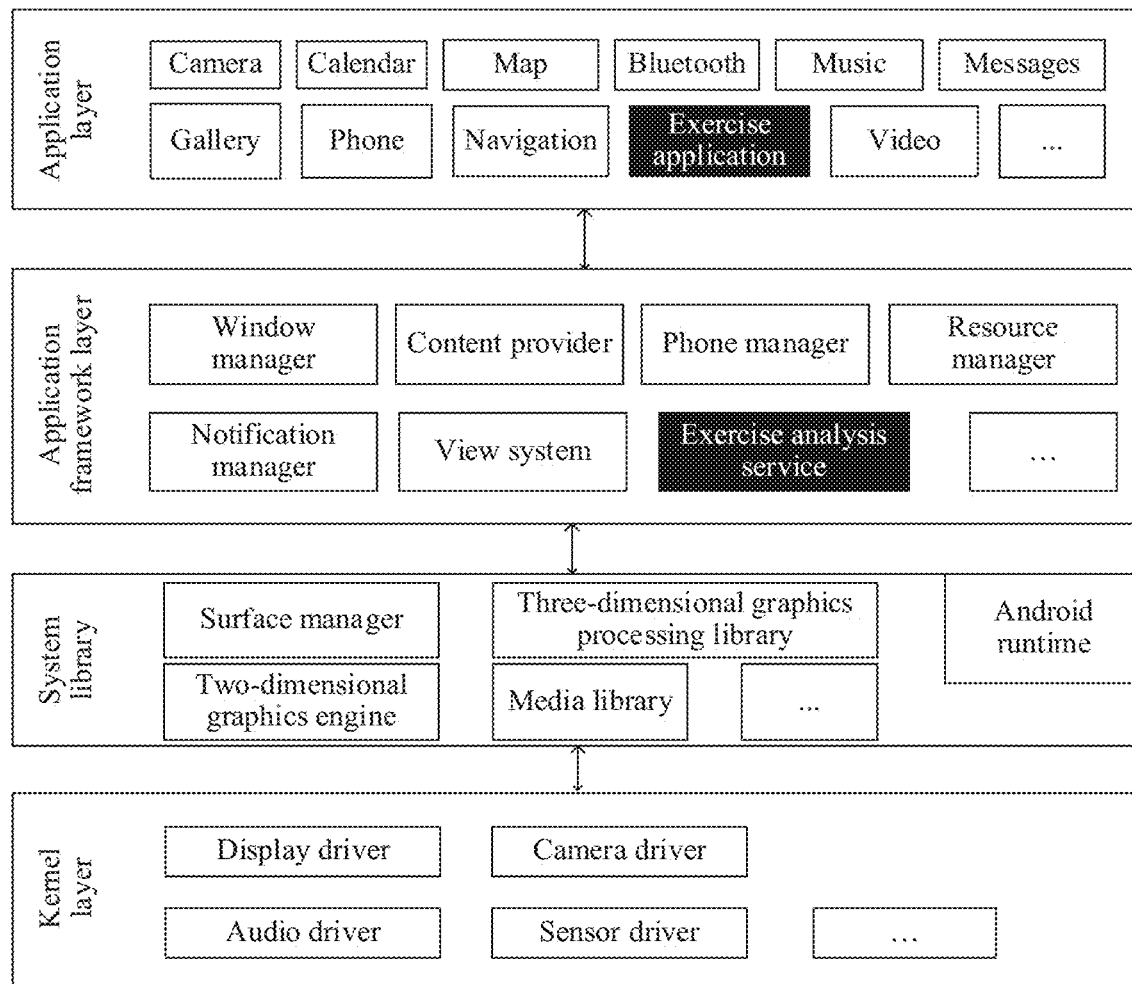
FIG. 2 is a schematic architectural diagram of an operating system on an electronic device according to an embodiment of this application.

FIG. 2 is a structural block diagram of software of a mobile phone 100 according to an embodiment of this application.

In the layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 2, applications such as Camera, Gallery, Calendar, Phone, Map, Navigation, Bluetooth, Music, Video, and Messages may be installed at the application layer.

In this embodiment of this application, various types of exercise applications may be further installed at the application layer, for example, one or more applications such as an app for running, an app for yoga, or an app for swimming. A user may use the exercise app to view exercise information during exercise. For example, the user may view information such as a running distance, a pace, and a heart rate in the exercise app during running.

The application framework layer provides an application programming interface (application programming interface, API) and a programming framework for an application at the application layer. The application framework layer includes some predefined functions.

As shown in FIG. 2, in this embodiment of this application, a service used to provide data analysis for the foregoing exercise app may be set at the application framework layer. For example, the service may be referred to as an exercise analysis service in this embodiment of this application. The exercise analysis service can monitor a running status of the exercise app and function as a bridge between the exercise app and other apps to transfer service content in other apps to the exercise app for display or execution.

For example, when the exercise app is run at the application layer, exercise data of the user during exercise may be collected by using one or more sensors in a sensor module, for example, an exercise speed exercise duration, and an exercise heart rate. After detecting that the exercise app is run, the exercise analysis service can obtain the exercise data collected by the exercise app. Further, the exercise analysis service may feed back service content that is related to the current exercise data and that is in another application to the exercise app. For example, if the exercise data of the user who is performing yoga is collected, the exercise analysis service may obtain a corresponding yoga video from a video app and send the yoga video to the exercise app. Further, the exercise app may display or play the service content that is of the another application and that is provided by the exercise analysis service.

In this way, in a process of completing the exercise by using the exercise app, the user can directly enjoy, in the exercise app, the service content that is related to the exercise and that is provided by the another application, and does not need to repeatedly switch between different apps or different display interfaces to search for content required by the user during exercise. In this way, exercise experience of the user when using the exercise app is improved.

Certainly, in addition to the foregoing exercise data, the exercise analysis service may further obtain current environment data, such as time, a temperature, and ambient light intensity, when the exercise app is run. Further, the exercise analysis service may determine, based on the environment data and the exercise data, specific service content to be fed back to the exercise app. This is described in detail in a subsequent embodiment. Therefore, details are not described herein.

Figure 3:
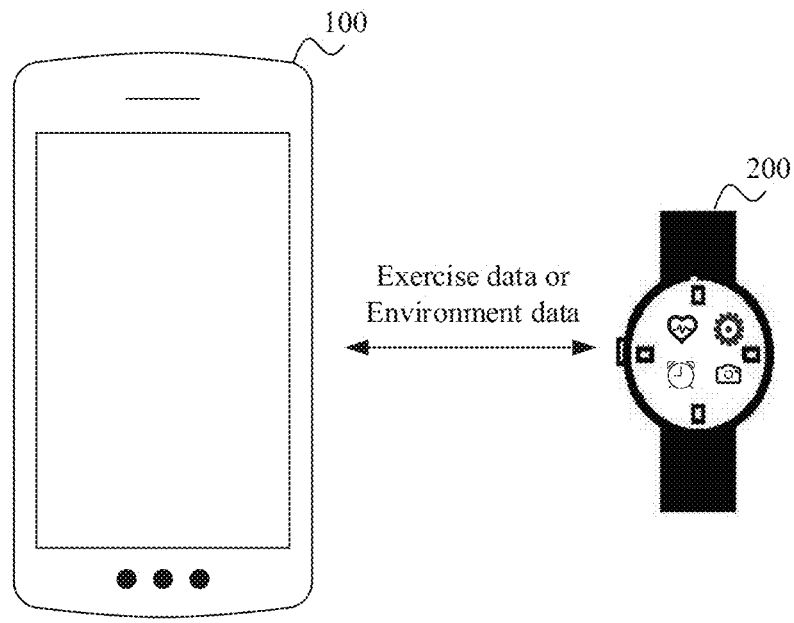
FIG. 3 is a schematic diagram 1 of a scenario of a recommendation method based on an exercise status of a user according to an embodiment of this application.

In addition, as shown in FIG. 3, the mobile phone 100 may further interact with a wearable device 200. The wearable device 200 may be a device, for example, a smartwatch, a smart band, a smart helmet, or a smart headset. This is not limited in this embodiment of this application. After the mobile phone 100 establishes a connection to the wearable device 200, the wearable device 200 may periodically send collected exercise data or environment data to the mobile phone 100. After the exercise analysis service in the mobile phone 100 detects that the exercise app starts to be run, the exercise analysis service may provide, in the exercise app according to the foregoing method and based on the exercise data or the environment data last sent by the wearable device 200, service content that is of another application and that is related to current exercise for the user.

Certainly, the application framework layer may further include a window manager, a content provider, a view system, a phone manager, a resource manager, a notification manager, and the like.

The window manager is configured to manage a window program. The window manager may obtain a size of a display, determine whether there is a status bar, lock a screen, take a screenshot, and the like. The content provider is configured to: store and obtain data, and enable the data to be accessed by an application. The data may include a video, an image, audio, calls that are made and received, a browsing history and a bookmark, a phone book, and the like. The view system includes visual controls such as a control for displaying a text and a control for displaying a picture. The view system may be configured to construct an application. A display interface may include one or more views. For example, a display interface including a Messages notification icon may include a text display view and a picture display view. The phone manager is configured to provide a communication function of the mobile phone 100, for example, management of a call status (including answering or declining). The resource manager provides various resources for an application, such as a localized character string, an icon, a picture, a layout file, and a video file. The notification manager enables an application to display notification information in a status bar, and may be configured to convey a notification message. The notification manager may automatically disappear after a short pause without requiring a user interaction. For example, the notification manager is configured to: notify download completion, give a message notification, and the like. The notification manager may alternatively be a notification that appears in a top status bar of the system in a form of a graph or a scroll bar text, for example, a notification of an application running in the background or a notification that appears on the screen in a form of a dialog window. For example, text information is prompted in the status bar, a prompt tone is produced, the electronic device vibrates, or the indicator light blinks.

The Android runtime includes a kernel library and a virtual machine. The Android runtime is responsible for scheduling and management of the Android system.

The kernel library includes two parts: a function that needs to be invoked in java language and a kernel library of Android.

The application layer and the application framework layer run on the virtual machine. The virtual machine executes java files at the application layer and the application framework layer as binary files. The virtual machine is configured to perform functions such as object lifecycle management, stack management, thread management, security and exception management, and garbage collection.

The system library may include a plurality of function modules, for example, a surface manager (surface manager), a media library (Media Libraries), a three-dimensional graphics processing library (for example, OpenGL ES), and a 2D graphics engine (for example, SGL).

The surface manager is configured to: manage a display subsystem and provide fusion of 2D and 3D layers for a plurality of applications.

The media library supports playback and recording of a plurality of commonly used audio and video formats, static image files, and the like. The media library may support a plurality of audio and video coding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, a sensor driver, and the like. This is not limited in this embodiment of this application.

Figure 4:
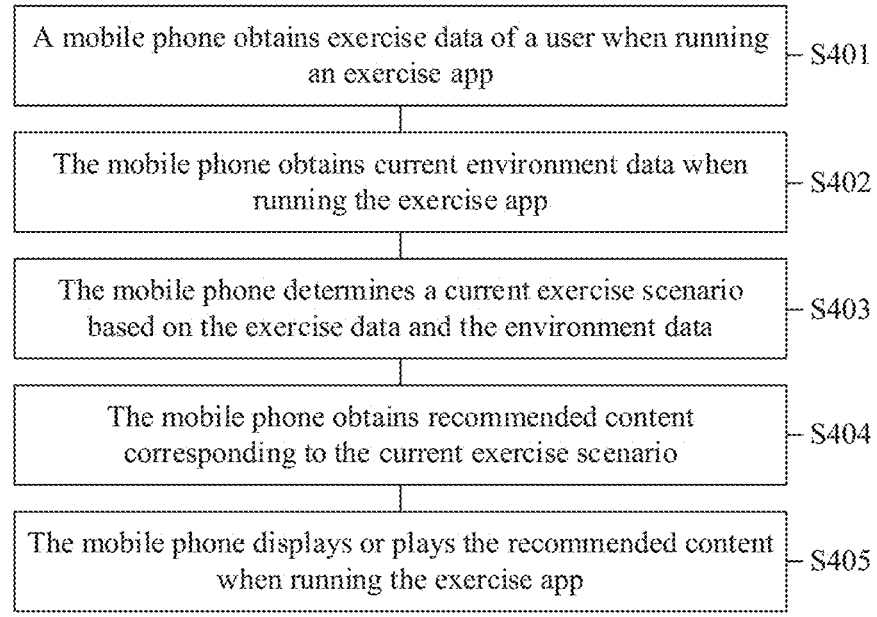
FIG. 4 is a schematic flowchart of a recommendation method based on an exercise status of a user according to an embodiment of this application.

The following describes in detail, with reference to the accompanying drawings by using an example in which a mobile phone is used as an electronic device, a recommendation method based on an exercise status of a user that is provided in the embodiments of this application. As shown in FIG. 4, the method includes the following steps.

S401: The mobile phone obtains exercise data of the user when running an exercise app.

The exercise data may be used to reflect a specific type of exercise that is being performed by the user, for example, walking, running, swimming, cycling, or yoga. This is not limited in this embodiment of this application.

Figure 5:
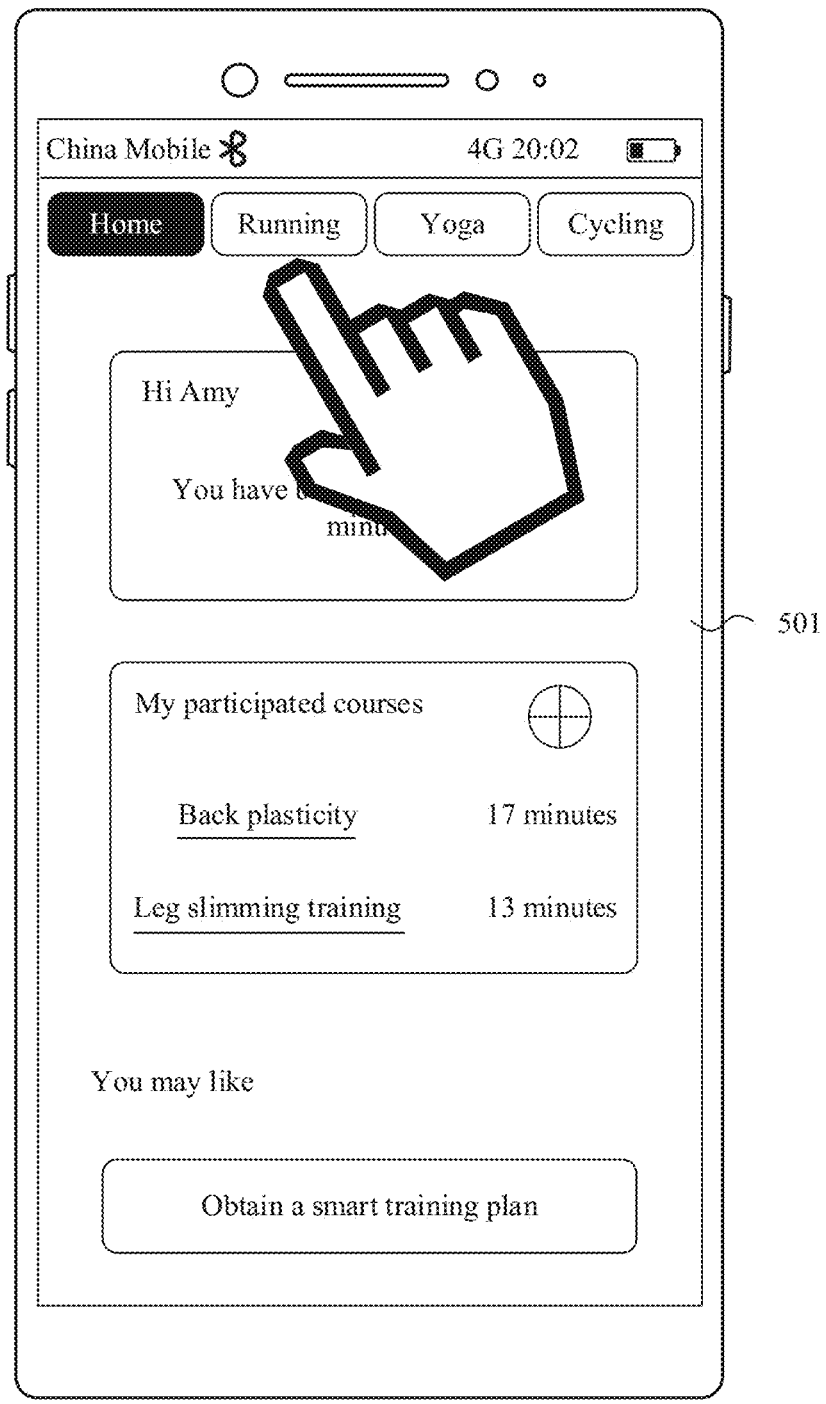
FIG. 5 is a schematic diagram 2 of a scenario of a recommendation method based on an exercise status of a user according to an embodiment of this application.

For example, after the mobile phone detects an operation of starting the exercise app by the user, as shown in FIG. 5, the mobile phone may display a home page 501 of the exercise app. On the home page 501, the user may select a specific exercise type, for example, walking, running, cycling, or yoga. In this case, if detecting that the user selects the exercise type of running on the home page 501, the mobile phone may learn that the current exercise data of the user is running. In addition, the mobile phone may further jump from the home page 501 to an interface of the exercise type of running.

Alternatively, after detecting that the user starts the exercise app or the user selects the exercise type of running, the mobile phone may further collect current exercise data of the mobile phone by using one or more sensors such as an acceleration sensor, a gyroscope, a GPS, a barometric pressure altitude sensor, or a distance sensor. For example, the exercise data may be a moving speed, a moving direction, a mobile phone posture, a climbing speed, and contact pressure of the mobile phone. If the user carries the mobile phone to do exercise, the collected exercise data of the mobile phone may also be used as the exercise data of the user to reflect the current exercise type of the user. For example, if the mobile phone determines, based on the collected exercise data, that the current exercise type of the user is running, the mobile phone may automatically jump from the home page 501 to the interface of the exercise type of running.

Alternatively, the user may wear a wearable device when using the exercise app to do exercise. In this case, after detecting that the user starts the exercise app, the mobile phone may further detect whether a wireless connection (for example, a Bluetooth connection) is established between the mobile phone and the wearable device. If the mobile phone establishes the wireless connection to the wearable device, the mobile phone may further obtain the exercise data of the user from the wearable device. For example, one or more sensors in the wearable device may collect the current exercise data of the user, and periodically report the collected exercise data to the mobile phone by using a Bluetooth module, so that the mobile phone can obtain the exercise data of the user.

In the foregoing embodiment, an example in which the user manually starts the exercise app to trigger the mobile phone to start to run the exercise app is used for description.

It may be understood that the mobile phone may alternatively start the exercise app automatically. For example, it may be preset in the mobile phone that the mobile phone automatically starts the exercise app when the mobile phone is powered on. In this case, after the mobile phone is powered on, the mobile phone may automatically start the exercise app to start running. For another example, the sensor in the mobile phone may periodically collect current exercise data and report the current exercise data to an exercise analysis service at a framework layer. When the exercise analysis service determines, based on the exercise data, that the user is in an exercising state, the mobile phone may be triggered to automatically start and run the exercise app.

In addition, that the mobile phone runs the exercise app may mean that the mobile phone runs the exercise app in the foreground, or may mean that the mobile phone runs the exercise app in the background. This is not limited in this embodiment of this application.

S402 (optional): The mobile phone obtains current environment data when running the exercise app.

The foregoing environment data may be used to reflect an environment feature during exercise of the user. For example, the environment data may be one or more pieces of data such as time, ambient light intensity, humidity, a wind scale, and a geographical location.

Similar to that in step S401, when running the exercise app, the mobile phone may collect the current environment data of the mobile phone by using one or more sensors such as a hygrometer, a thermometer, an ambient light sensor, and an infrared sensor. Alternatively, these sensors may be disposed in the wearable device in advance. When detecting that the user starts the exercise app in the mobile phone and the user wears the wearable device, the mobile phone may obtain, from the wearable device, the current environment data collected by the wearable device.

S403: The mobile phone determines a current exercise scenario based on the exercise data and the environment data.

For example, the mobile phone may determine, by using a prestored exercise model, the exercise type corresponding to the exercise data. As shown in Table 1, a correspondence (for example, a first correspondence) between different exercise types and different exercise models may be preset in the mobile phone. For example, when an exercise speed in the exercise model is 2 to 3 m/s, a corresponding exercise type is jogging. When contact pressure on a device surface in the exercise model is less than 10000 Pa, a corresponding exercise type is swimming. When a climbing speed in the exercise model is greater than 0.2 m/s, a corresponding exercise type is mountain climbing. In this case, the mobile phone may find a corresponding exercise model in Table 1 based on the exercise data obtained in step S401, and then determine the corresponding exercise type.

TABLE 1

| Exercise type | Exercise model |
| --- | --- |
| Jogging | The speed is 2 to 3 m/s |
| Swimming | The contact pressure on the device surface is less than 10000 Pa |
| Mountain climbing | The climbing speed is greater than 0.2 m/s |

For example, the mobile phone may determine, by using a prestored environment model, the environment feature corresponding to the environment data. As shown in Table 2, a correspondence (for example, a second correspondence)

between different environment features and environment models may be further preset in the mobile phone. For example, when ambient light intensity in the environment model is between 0.001 lm and 0.3 lm, a corresponding environment feature is nighttime. When ambient light intensity in the environment model is between 50 lm and 500 lm, a corresponding environment feature is outdoor on a cloudy day. When time in the environment model is before 9 o'clock in the morning and the temperature is lower than 10° C., a corresponding environment feature is winter morning. In this case, the mobile phone may find a corresponding environment model in Table 2 based on the environment data obtained in step S402, and then determine the corresponding environment feature.

TABLE 2

| Environment feature | Environment model |
| --- | --- |
| Nighttime | Luminance: 0.001 to 0.3 lm |
| Outdoor on a cloudy day | Luminance: 50 to 500 lm |
| Winter morning | Time: before 9:00; temperature: lower than 10° C. |

After the mobile phone separately determines the exercise type and the environment feature based on the obtained exercise data and the obtained environment data, the mobile phone may synthesize the determined exercise type and environment feature into the corresponding exercise scenario. For example, if the exercise type determined by the mobile phone in Table 1 is jogging, and the environment feature determined in Table 2 is winter morning, after synthesizing the exercise type and the environment feature, the mobile phone may determine that the corresponding exercise scenario is jogging in winter morning. In this way, when the user performs different exercise in different scenarios, the mobile phone may determine a corresponding exercise scenario by obtaining corresponding exercise data and environment data. It may be learned that the exercise scenario in this embodiment of this application may reflect at least the type of exercise that is being performed by the user, for example, running, cycling, swimming, mountain climbing, or yoga. Further, the exercise scenario determined by the mobile phone may further reflect the specific environment feature during exercise performed by the user, for example, time, a location, a season, a temperature, humidity, or light intensity during exercise.

It should be noted that the foregoing step S402 (to be specific, the mobile phone obtains the current environment data when running the exercise app) is an optional step. In other words, the mobile phone may determine the current exercise scenario based on only the obtained exercise data. For example, the mobile phone may use the exercise type corresponding to the obtained exercise data as the current exercise scenario by using Table 1. In addition, a sequence of performing steps S401 and S402 is not limited in this embodiment of this application. For example, the mobile phone may first obtain the current environment data, and then obtain the current exercise data. Alternatively, the mobile phone may first obtain the current exercise data, and then obtain the current environment data. Certainly, the mobile phone may alternatively obtain the environment data and the exercise data at the same time. This is not limited in this embodiment of this application.

In some other embodiments, as shown in Table 3, a correspondence among an exercise model, an environment model, and an exercise scenario may be pre-established in the mobile phone. Further, the mobile phone may find the corresponding exercise model and environment model in Table 3 based on the exercise data and the environment data that are obtained in steps S401 and S402, and then determine the exercise scenario corresponding to the exercise data and the environment data (that is, an exercise scenario corresponding to the found exercise model and environment model).

TABLE 3

| Exercise model | Environment model | Exercise scenario |
| --- | --- | --- |
| Speed: 2 to 3 m/s | Luminance: 0.001 to 0.3 lm | Jogging at night |
| Speed: 2 to 3 m/s | Luminance: 50 to 500 lm | Outdoor jogging on a cloudy day |
| Climbing speed > 0.2 m/s | Time: before 9:00; temperature < 10° C. | Climbing in the winter morning |

Alternatively, the mobile phone may further send the obtained exercise data and environment data to a server. Further, the server may determine the current exercise scenario based on the exercise data and the environment data, and send the determined exercise scenario to the mobile phone, so that the mobile phone can determine the current exercise scenario.

S404: The mobile phone obtains recommended content corresponding to the current exercise scenario.

For example, for different exercise scenarios, one or more pieces of corresponding recommended content may be preset on the mobile phone. For example, when the exercise scenario is running on a treadmill, corresponding recommended content may be set to a song 1 and a song 2. When the exercise scenario is jogging at night, corresponding recommended content may be set to a weather forecast and a song 3. When the exercise scenario is winter yoga, corresponding recommended content may be set to a yoga video and the like. In this way, the mobile phone may determine, based on the current exercise scenario, the specific recommended content recommended to the user in this exercise process. In different exercise scenarios, the mobile phone may determine, for the user, recommended content related to the current exercise scenario, and recommend the recommended content to the user.

In some embodiments, the mobile phone may further determine, based on a historical behavior habit of the user, the recommended content corresponding to the current exercise scenario. In this case, in a same exercise scenario, recommended content determined by the mobile phone for different users is related to historical behavior habits of the users, so that personalized and customized recommended content is provided for the users during exercise.

Figure 6:
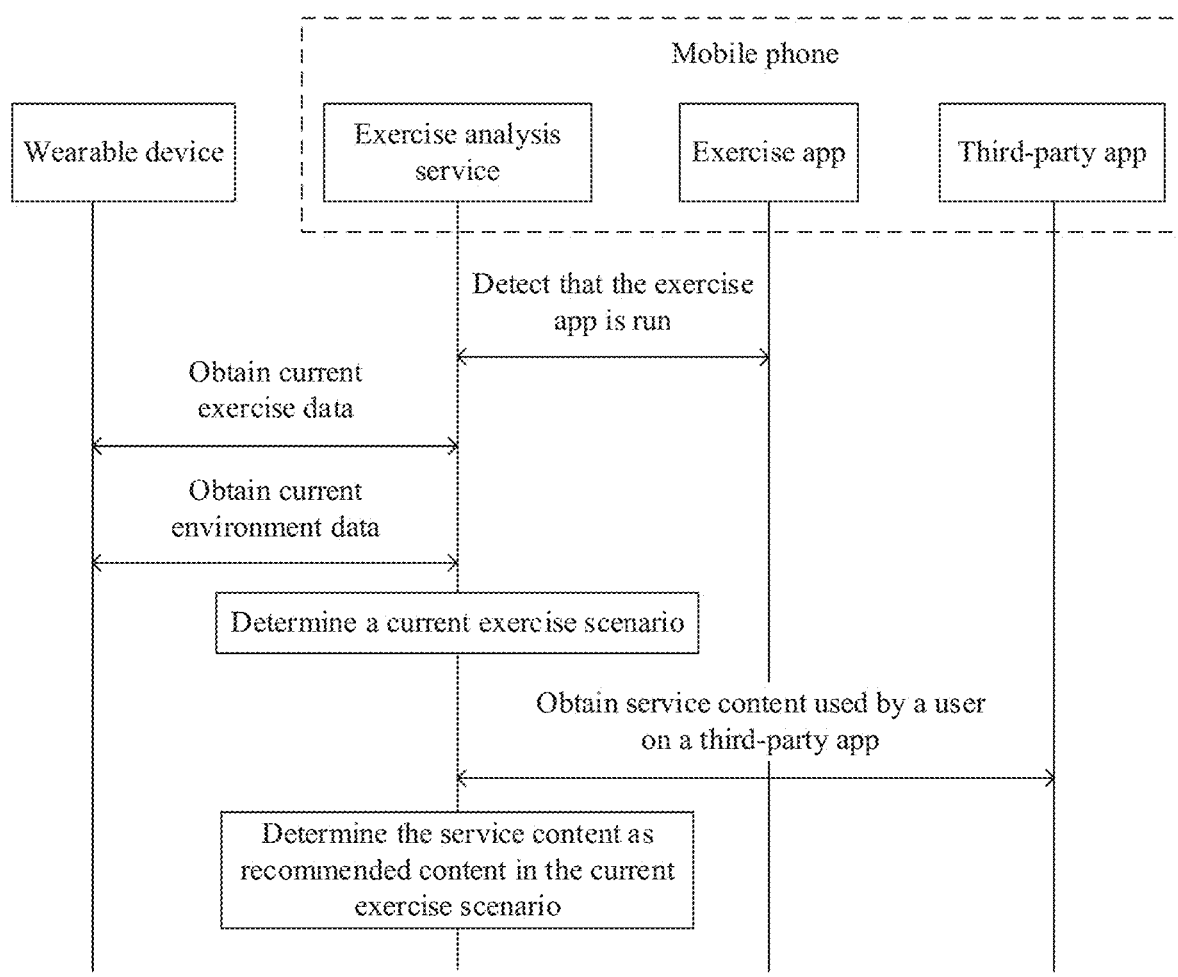
FIG. 6 is a schematic interaction diagram 1 of a recommendation method based on an exercise status of a user according to an embodiment of this application.

For example, when running the exercise app, the mobile phone may collect statistics on operation habits of the user in different exercise scenarios. For example, the exercise analysis service in the mobile phone may detect a running status of the exercise app in real time. As shown in FIG. 6, when the user wears the wearable device to do exercise, if the exercise analysis service detects that the exercise app starts to be run, the mobile phone may obtain current exercise data and environment data from the wearable device, and determine, based on the exercise data and the environment data, a specific exercise scenario in which the user is currently located. For descriptions of obtaining the exercise data and the environment data and determining the exercise scenario, refer to related descriptions of steps S401 to S403. After determining the current specific exercise scenario, the exercise analysis service may further continue to monitor an operation performed by the user or a function used by the user in a third-party app (for example, a music application, a video application, and a weather application), in other words, monitor service content provided by the third-party app for the user in the current exercise scenario. For example, if detecting that the user starts the music app to listen to the song 1 in a running scenario, the exercise analysis service may use the song 1 as recommended content for the user in the running scenario. Further, the exercise analysis service may obtain resource information of the song 1, and establish a correspondence between the running scenario and the resource information of the song 1, in this way, in step S404, if the exercise analysis service determines that the current exercise scenario is also the running scenario, the exercise analysis service may determine, based on the foregoing correspondence, that the recommended content currently recommended to the user is the song 1.

It should be noted that, when the mobile phone detects that the user uses service content in the third-party app, the mobile phone may determine, according to a specific policy, whether to determine the service content as the recommended content in the current exercise scenario. For example, if the mobile phone detects, in an outdoor jogging scenario for three consecutive times, that the user starts the music app to play the song 1, the mobile phone may determine that the user has a behavior habit of listening to the song 1 during outdoor jogging. In this case, the mobile phone may obtain the resource information of the song 1. For example, the resource information may be a storage address of the song 1 in a memory, or the resource information may be a URL (uniform resource locator, uniform resource locator) address of the song 1.

In addition, in addition to monitoring the service content used by the user in the third-party app, the mobile phone may further monitor the service content used by the user in the exercise app. For example, in the running scenario with the treadmill, if the mobile phone detects that the user has viewed heart rate information in the exercise app for four consecutive times, and if the mobile phone detects that the user has viewed an indoor temperature and humidity for three consecutive times, the mobile phone may determine a behavior habit of viewing the heart rate, the indoor temperature, and the indoor humidity when the user runs on the treadmill. In this case, the mobile phone may record resource information of heart rate information, temperature information, and humidity information.

In this case, as shown in Table 4, the mobile phone may establish a correspondence between different exercise scenarios of the user and different recommended content. Each piece of recommended content is a behavioral habit that is collected by the mobile phone and that is related to the behavioral habit of the user. In this case, in step S404, after determining the current exercise scenario, the mobile phone may determine, based on the correspondence shown in Table 4, resource information (in Table 4, an example in which the URL address is resource information is used) of one or more pieces of recommended content related to the behavior habit of the user in the current exercise scenario. Then, the mobile phone may obtain specific recommended content based on the URL address of the recommended content. In this way, the mobile phone may customize personalized recommended content for different users and different exercise scenarios.

TABLE 4

| Exercise scenario | Recommended content | | |
|---|---|---|---|
| | Video/Audio | Fitness and health information | Environment information |
| Jogging at night | URL address of a song 1: xxx; URL address of a song 2: xxx; | URL address of a running time period and a running distance: xxx | URL address of a weather forecast: xxx |
| Running on a treadmill | URL address of a video A: xxx | URL address of a running heart rate: xxx | URL address of indoor temperature information and indoor humidity information: xxx |
| Climbing in the winter morning | ... | ... | ... |

Figure 7:
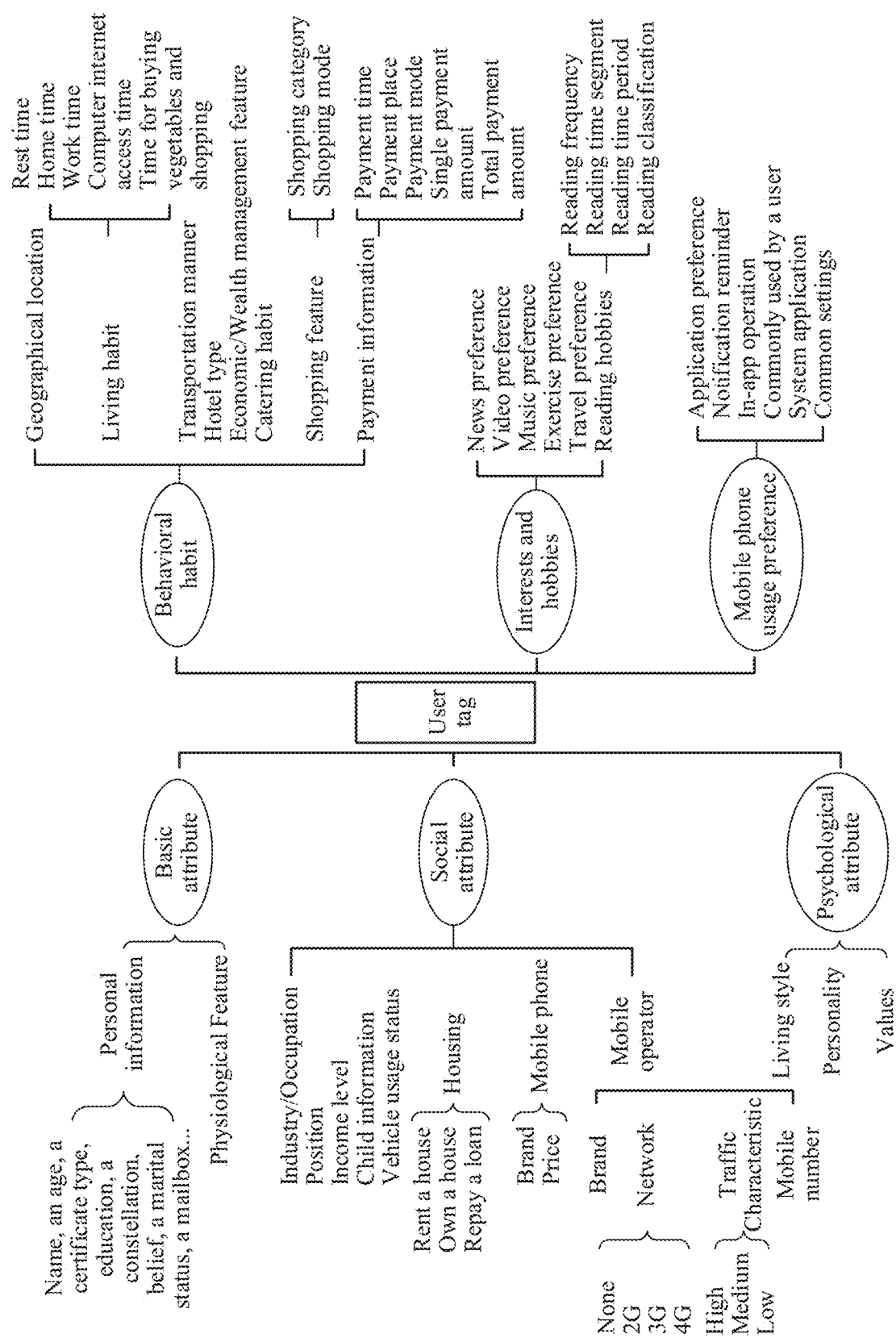
FIG. 7 is a schematic diagram 3 of a scenario of a recommendation method based on an exercise status of a user according to an embodiment of this application.

In some other embodiments, the mobile phone may further determine, based on a user profile (user profile) of the user, the recommended content corresponding to the current exercise scenario. Specifically, the mobile phone may abstract an information panorama of the user, namely, the user profile of the user, by collecting and analyzing various kinds of behavior data of the user who uses the mobile phone. For example, the user profile usually includes one or more user tags used to reflect a user characteristic. As shown in FIG. 7, the user tags of the user include but are not limited to the following six types of tags: a basic attribute, a social attribute, a behavioral habit, interests and hobbies, a psychological attribute, a mobile phone usage preference, and the like.

The basic attribute category includes but is not limited to personal information and a physiological feature. The personal information category includes but is not limited to: a name, an age, a certificate type, education, a constellation, belief, a marital status, and a mailbox.

The social attribute category includes but is not limited to: an industry/occupation, a position, an income level, child information, a vehicle usage status, housing, a mobile phone, and a mobile network operator. The housing category may include: renting a house, owning a house, and repaying a loan. The mobile phone category may include: a brand and a price. The mobile network operator category may include: a brand, a network, a traffic characteristic, and a mobile number. The brand category may include: China Mobile, China Unicorn, China Telecom, and others. The network category may include: none, 2G, 3G, and 4G. The traffic characteristic category may include: high, medium, and low.

The behavior habit category includes but is not limited to: a geographical location, a living habit, a transportation manner, a hotel type, an economic/wealth management feature, a catering habit, a shopping feature, and payment information. The living habit category may include: rest time, home time, work time, computer internet access time, and time for buying vegetables and shopping. The shopping feature category may include a shopping category and a shopping mode. The payment information category may include: payment time, a payment place, a payment mode, a single payment amount, and a total payment amount.

The interests and hobbies category include but are not limited to: reading preference, news preference, video preference, music preference, exercise preference, and travel preference. The reading preference category may include: a reading frequency, a reading time segment, a total reading time period, and a reading classification.

The psychological attribute category includes but is not limited to: a lifestyle, personality, and values.

The mobile phone usage preference category includes but is not limited to: application preference, a notification reminder, an in-app operation, commonly used by a user, a system application, and common settings.

In this case, in step S404, after determining the current exercise scenario, the mobile phone may determine, for the user based on the user profile of the user, the recommended content corresponding to the current exercise scenario. For example, if the user profile of the user includes two user tags: reading and history, the mobile phone may use, as the recommended content in the current exercise scenario, an e-book related to history that is recently read by the user. If the user profile of the user includes three user tags: music, pop, and Taylor Swift, the mobile phone may use one or more songs whose singer name is Taylor Swift as the recommended content in the current exercise scenario.

Certainly, the mobile phone may alternatively send a recommendation request to the server, to request the server to determine the recommended content corresponding to the current exercise scenario for the mobile phone, and return the determined recommended content to the mobile phone. This is not limited in this embodiment of this application.

S405: The mobile phone displays or plays the recommended content when running the exercise app.

For example, the mobile phone may display the recommended content on a display interface of the exercise app. Alternatively, the mobile phone may play the foregoing recommended content when running the exercise app. For example, after obtaining the recommended content corresponding to the current exercise scenario, the mobile phone may automatically display detailed information or a shortcut of the recommended content on the display interface of the exercise app. When displaying the detail information of the recommended content, the mobile phone may also automatically play the detail information of the recommended content in a voice manner. When displaying the shortcut of the recommended content, if detecting that the user selects the shortcut, the mobile phone may start to display or play the detailed information of the recommended content. Alternatively, after obtaining the recommended content corresponding to the current exercise scenario, the mobile phone may further automatically play the recommended content in the voice manner when running the exercise app. Alternatively, the mobile phone may further respond to a gesture of the user to broadcast the recommended content by voice. When broadcasting the recommended content by voice, the mobile phone may display the recommended content on the display interface of the exercise app, or may not display the recommended content on the display interface of the exercise app. This is not limited in this embodiment of this application.

Figure 8:
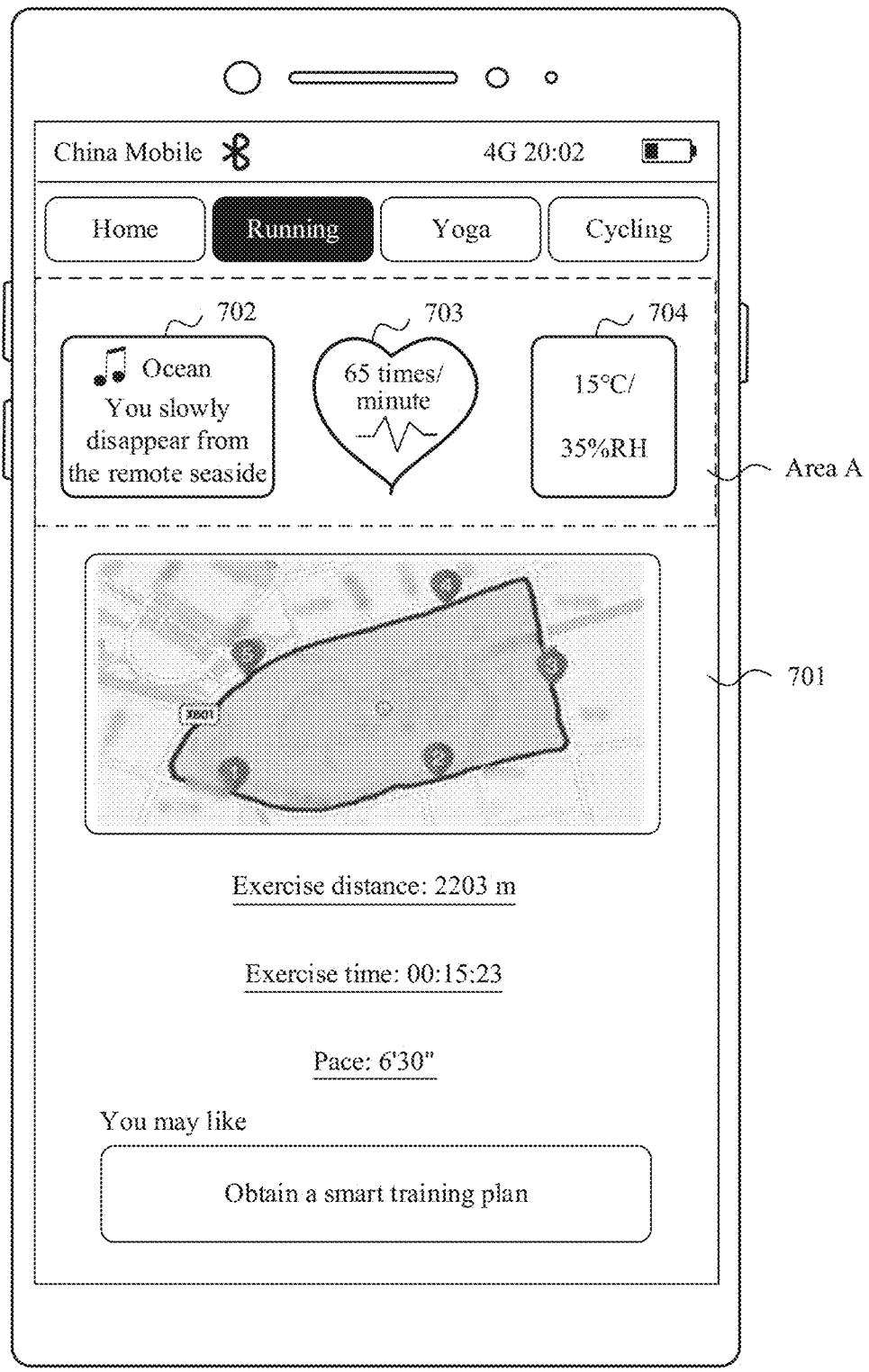
FIG. 8 is a schematic diagram 4 of a scenario of a recommendation method based on an exercise status of a user according to an embodiment of this application.

The exercise app in FIG. 5 is still used as an example, after detecting that the user for example, a user Amy) selects the exercise type of running on a home page 501, the mobile phone may determine, by performing steps S401 to S403, that the current exercise scenario is running on the treadmill, and then, the mobile phone may determine, by performing step S404, that the recommended content corresponding to the exercise scenario of running on the treadmill is the song 1, the heart rate information, and the indoor temperature and humidity. In this case, as shown in FIG. 8, when displaying a running interface 701 in the exercise app, the mobile phone may simultaneously display detailed information of the foregoing three pieces of recommended content (namely, recommended content 702 to 704) on the forming interface 701. In this way, after opening the running interface 701 in the exercise app, the user can see display content in the running interface 701, and see content (such as a lyrics and a singer) of the song 1, the heart rate information during exercise, and the current indoor temperature and humidity.

Because the recommended content displayed in the running interface 701 of the mobile phone is related to the current exercise scenario of the user, in other words, service content that may be required when the user runs on the treadmill, the user may also view specific details of the service content when viewing the running interface 701, so that a quantity of times of jumping and switching between a plurality of interfaces of the mobile phone during exercise of the user is reduced, and exercise experience of the user is improved.

Figure 9:
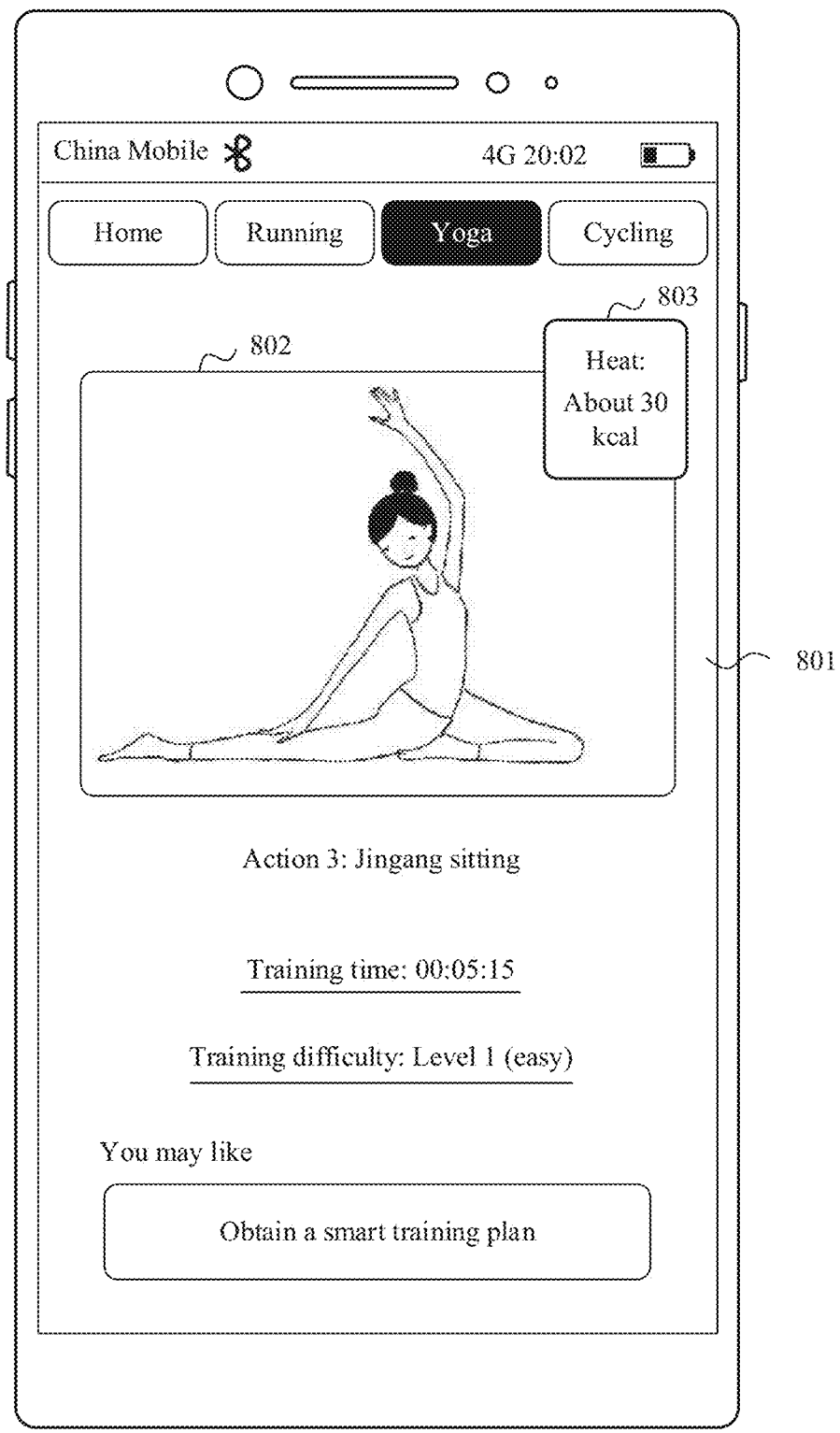
FIG. 9 is a schematic diagram 5 of a scenario of a recommendation method based on an exercise status of a user according to an embodiment of this application.

For example, if detecting that an exercise scenario in which the user (for example, the user Amy) is currently located is an indoor yoga scenario, the mobile phone may determine that recommended content related to the indoor yoga scenario is a yoga video and heat information. Further, as shown in FIG. 9, the mobile phone may display a yoga video (namely, recommended content 802) recommended to the user and real-time heat information (namely, recommended content 803) on a yoga interface 801 of the exercise app. The recommended content determined by the mobile phone may be service content provided by another app other than the exercise app, or the recommended content may be service content provided by another interface in the exercise app other than the current interface. This is not limited in this embodiment of this application.

Further, the recommended content displayed for the user on the running interface 701 may be related to a behavior habit of the user when the user runs on the treadmill. In other words, each piece of recommended content displayed in the running interface 701 of the mobile phone may be frequently used by the user when the user normally runs on the treadmill, so that the mobile phone can provide personalized recommended content for different users based on behavior habits of the users.

Figure 10:
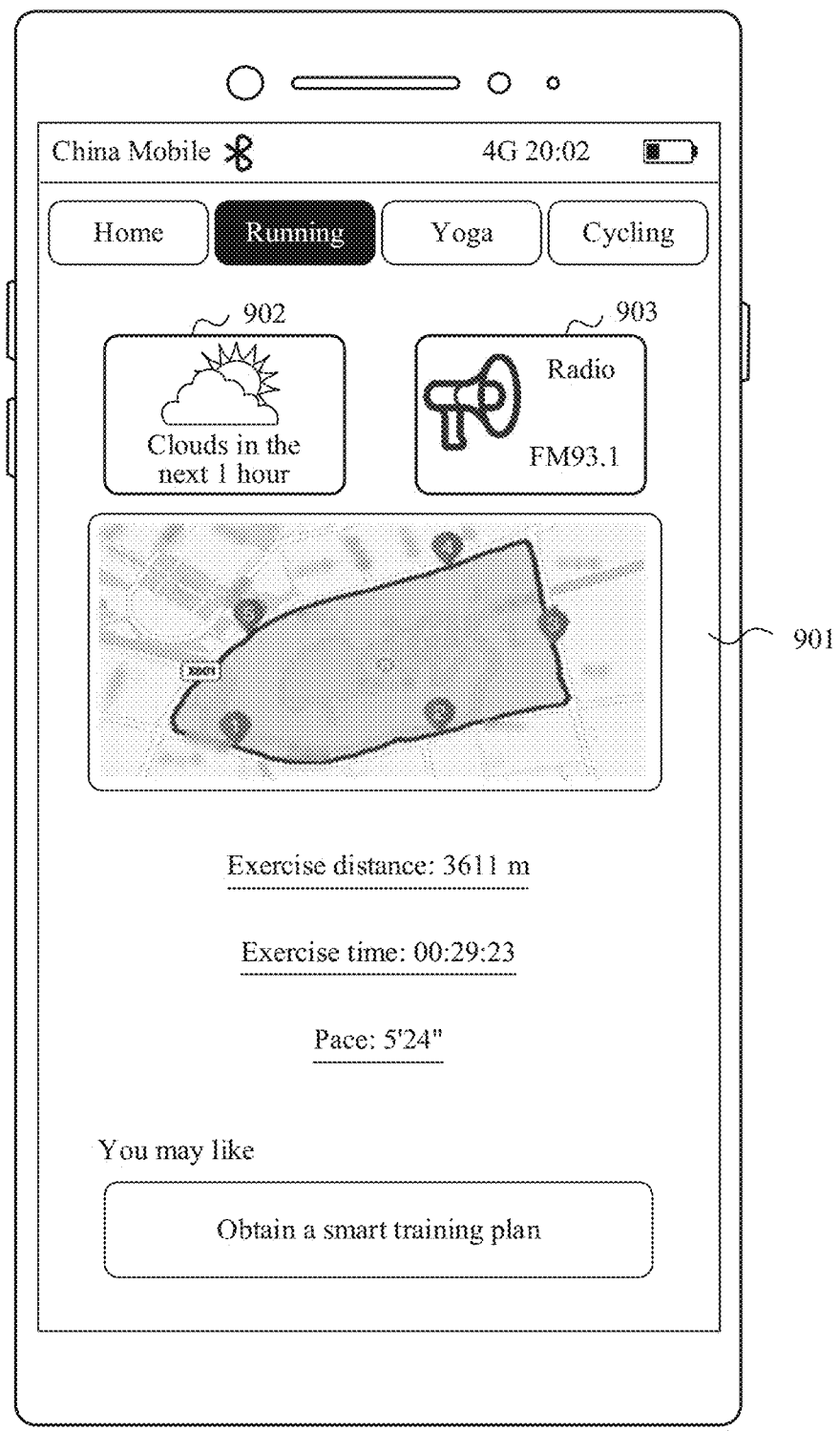
FIG. 10 is a schematic diagram 6 of a scenario of a recommendation method based on an exercise status of a user according to an embodiment of this application.

For example, if another user (for example, a user Sam) also opens a running interface of the exercise app in the running scenario of running on the treadmill, because the user Sam often uses a weather forecast function and a radio function in a mobile phone when running on the treadmill, the mobile phone may use a weather forecast of next one hour in a weather application and a channel A in a radio application as the recommend content. In this case, in response to an operation of opening the running interface 901 of the exercise app by the user Sam, as shown in FIG. 10, the mobile phone may display the weather forecast (that is, recommended content 902) of the next one hour and the channel A (recommended content 903) in the running interface 901. In this way, the mobile phone may display corresponding recommended content to the user in the exercise app based on use habits of different users in different exercise scenarios.

It should be noted that, when the recommended content determined by the mobile phone includes audio content (for example, the recommended content 702, the recommended content 802, and the recommended content 903), the mobile phone may automatically play the corresponding audio content when displaying the recommended content. Certainly, the mobile phone may also play the corresponding audio content when detecting that the user triggers the recommended content. For example, after detecting that the user taps the recommended content 702 in the running interface 701, the mobile phone may start to play the song 1 corresponding to the recommended content 702.

Figure 11:
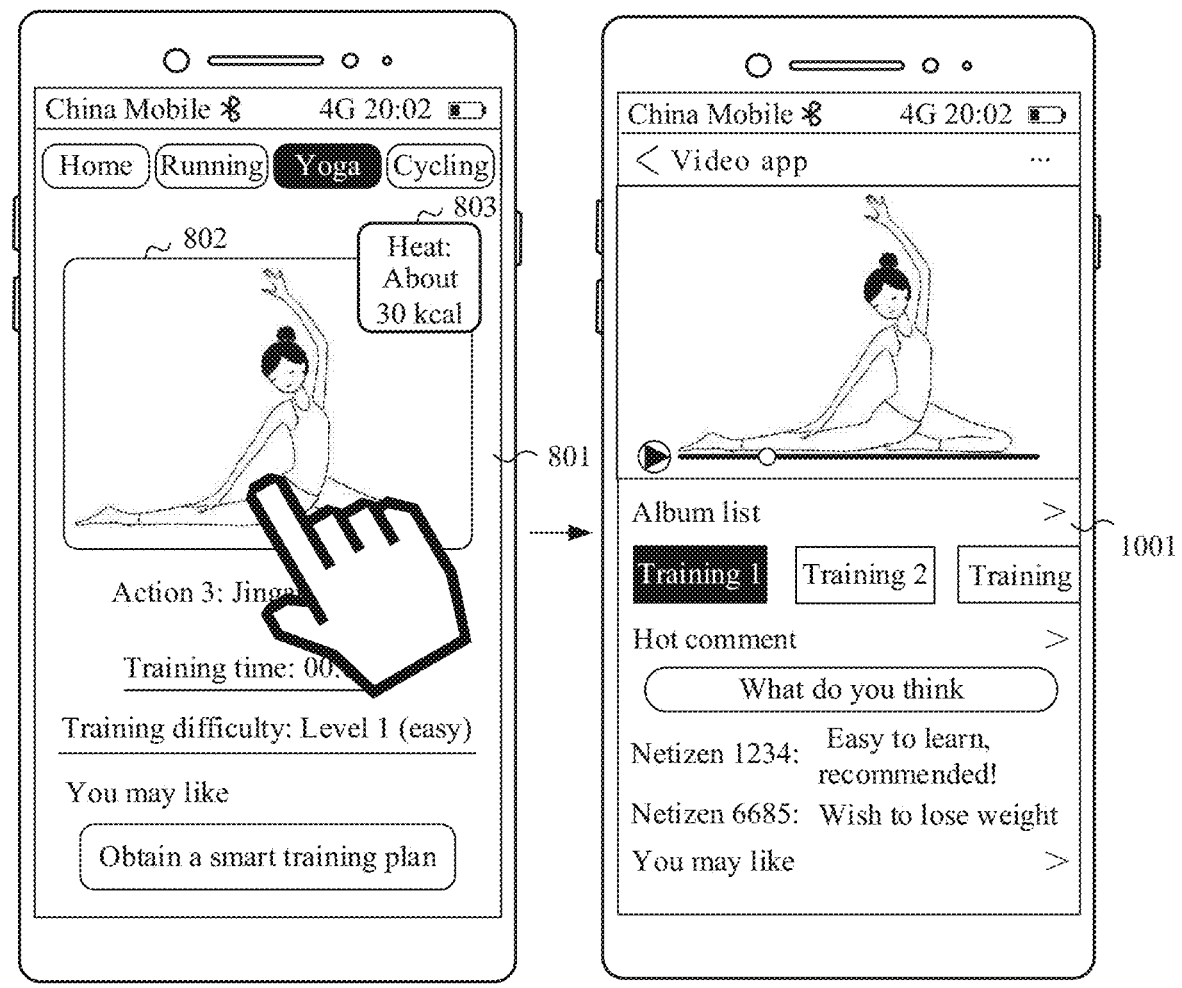
FIG. 11 is a schematic diagram 7 of a scenario of a recommendation method based on an exercise status of a user according to an embodiment of this application.

In addition, after the mobile phone displays the recommended content, if detecting that the user taps a piece of recommended content, the mobile phone may jump to a related interface of an app to which the recommended content belongs. For example, as shown in FIG. 11, if detecting that the user taps the recommended content 802 in the yoga interface 801, the mobile phone may display an interface 1001 on which the yoga video in the video app is located. In other words, the user may accurately jump, in the exercise app, to an interface in which the recommended content determined by the mobile phone is located.

Figure 12:
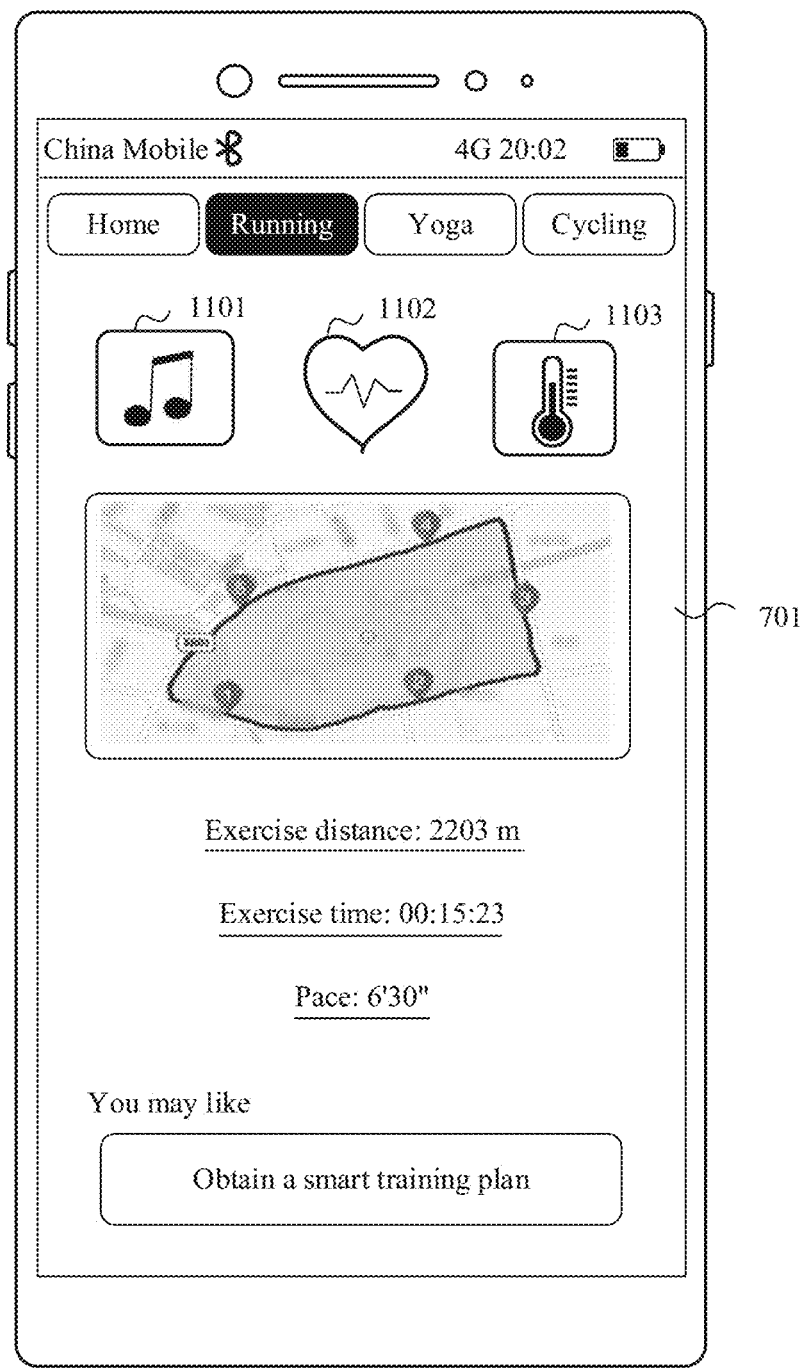
FIG. 12 is a schematic diagram 8 of a scenario of a recommendation method based on an exercise status of a user according to an embodiment of this application.

In some other embodiments, when displaying the recommended content in the interface of the exercise app, the mobile phone may display only the shortcut of the recommended content, instead of displaying the specific information in the recommended content. For example, after the user selects the exercise type of running on the home page 501, the mobile phone may determine that corresponding recommended content is the song 1, the heart rate information, and the indoor temperature and humidity. Further, as shown in FIG. 12, the mobile phone may display a shortcut 1101 of music, a shortcut 1102 of heart rate information, and a shortcut 1103 of indoor temperature and humidity in the running interface 701. Subsequently, if detecting that the user taps the shortcut 1101, the mobile phone may start to play the song 1. Similarly, if detecting that the user taps the shortcut 1102, the mobile phone may start to broadcast the current heart rate information of the user by voice. In other words, if detecting that the user selects a shortcut, the mobile phone may directly display or play detailed information of corresponding recommended content in the display interface of the exercise app, and does not need to jump to a display interface corresponding to the shortcut, so that a quantity of times that the user switches between display interfaces during exercise is reduced, and user experience during exercise is improved. Certainly, if detecting that the user selects a shortcut, the mobile phone may also jump to the display interface corresponding to the shortcut. This is not limited in this embodiment of this application.

Figure 13:
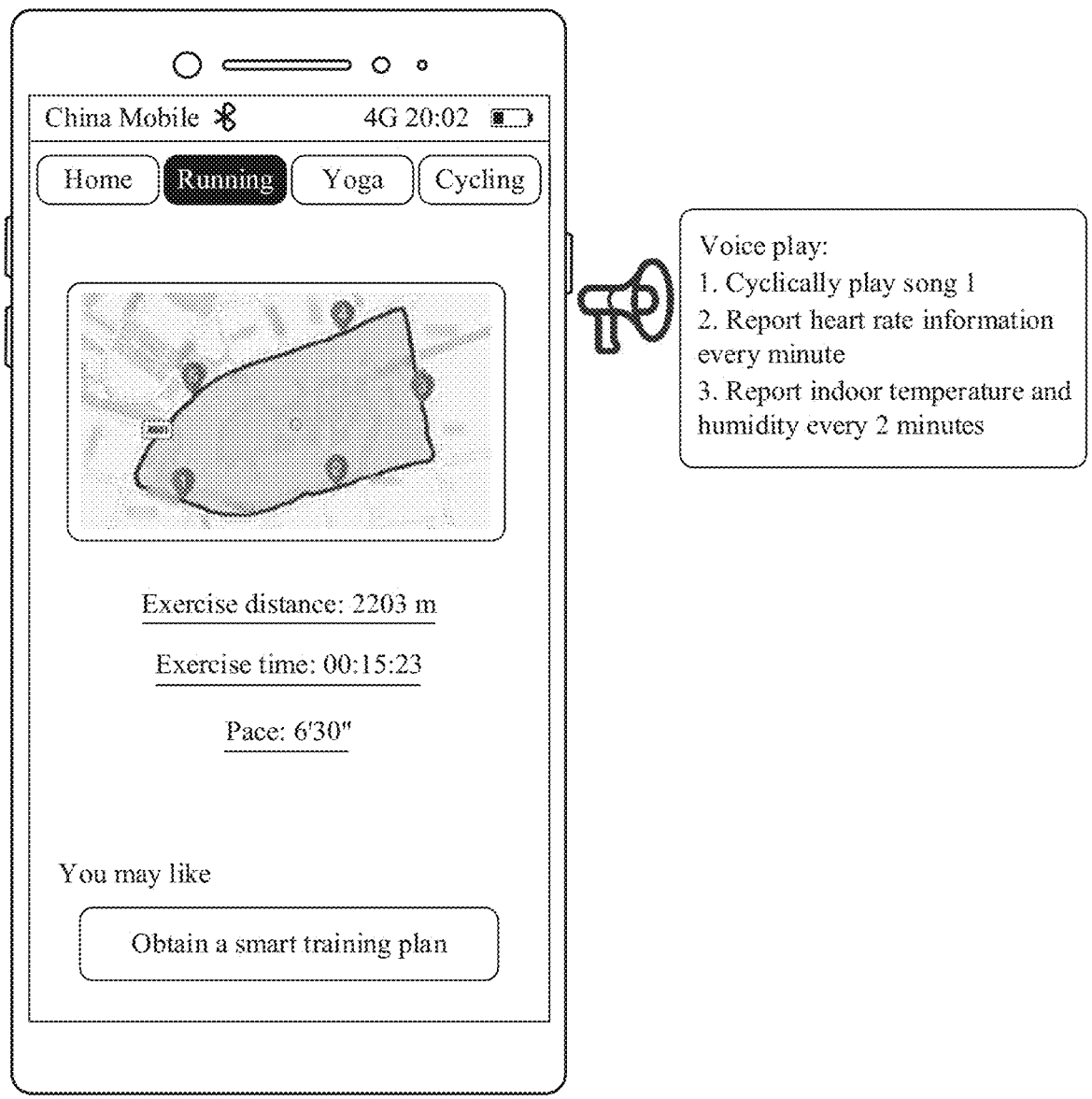
FIG. 13 is a schematic diagram 9 of a scenario of a recommendation method based on an exercise status of a user according to an embodiment of this application.

In some other embodiments, after the mobile phone determines the recommended content corresponding to the current exercise scenario, if the mobile phone is still running the exercise app, it indicates that the user is in an exercise process. In this case, the mobile phone may also play the foregoing recommended content in a voice manner. For example, after determining that the current exercise scenario is running on the treadmill, the mobile phone may obtain the recommended content corresponding to the exercise scenario of running on the treadmill: the song 1, the heart rate information, and the indoor temperature and humidity. In this case, as shown in FIG. 13, if the mobile phone is running the exercise app at this time, the mobile phone may play the foregoing recommended content in the voice manner. For example, the mobile phone may repeatedly play the song 1. For another example, the mobile phone may broadcast the current heart rate information to the user by voice every one minute. For another example, the mobile phone may broadcast the current indoor temperature and humidity to the user by voice every two minutes. In this case, the mobile phone may display the recommended content in the running interface 701 of the exercise app, or may not display the recommended content in the running interface 701. This is not limited in this embodiment of this application.

For example, the mobile phone may further be preset to trigger, in a triggering manner such as tapping a device, shaking a device, or lifting a hand, the mobile phone to play the recommended content. For example, if detecting that the user taps a screen of the mobile phone once, the mobile phone may play the song 1. If detecting that the user taps the screen twice consecutively, the mobile phone may play the currently detected heart rate information. If detecting that the user taps the screen three consecutive times, the mobile phone may play the currently detected indoor temperature and humidity. Certainly, the mobile phone may also automatically play the foregoing recommended content when running the exercise app. This is not limited in this embodiment of this application.

In some other embodiments, after the mobile phone obtains the recommended content corresponding to the current exercise scenario, the mobile phone may further choose, based on the determined exercise scenario, to play the recommended content in the voice manner or display the recommended content in the interface. Further, the mobile phone may perform step S405, in other words, the mobile phone may display or play the recommended content. For example, if the mobile phone determines that the current exercise scenario is an indoor exercise scenario, for example, running on the treadmill, the mobile phone may choose to display the determined recommended content in the interface of the exercise app. Correspondingly, if the mobile phone determines that the current exercise scenario is an outdoor exercise scenario, for example, jogging in the morning, the mobile phone may choose to play the foregoing recommended content in the voice manner. For another example, if the mobile phone determines that the current exercise scenario is a single-person exercise scenario, for example, yoga before sleep, the mobile phone may choose to display the determined recommended content in the interface of the exercise app. Correspondingly, if the mobile phone determines that the current exercise scenario is a multi-person exercise scenario, for example, outdoor basketball, the mobile phone may choose to play the foregoing recommended content in the voice manner. In this way, the mobile phone may select, based on features of different exercise scenarios, an appropriate manner to recommend the recommended content determined by the mobile phone to the user, to improve exercise experience of the user.

Figure 14:
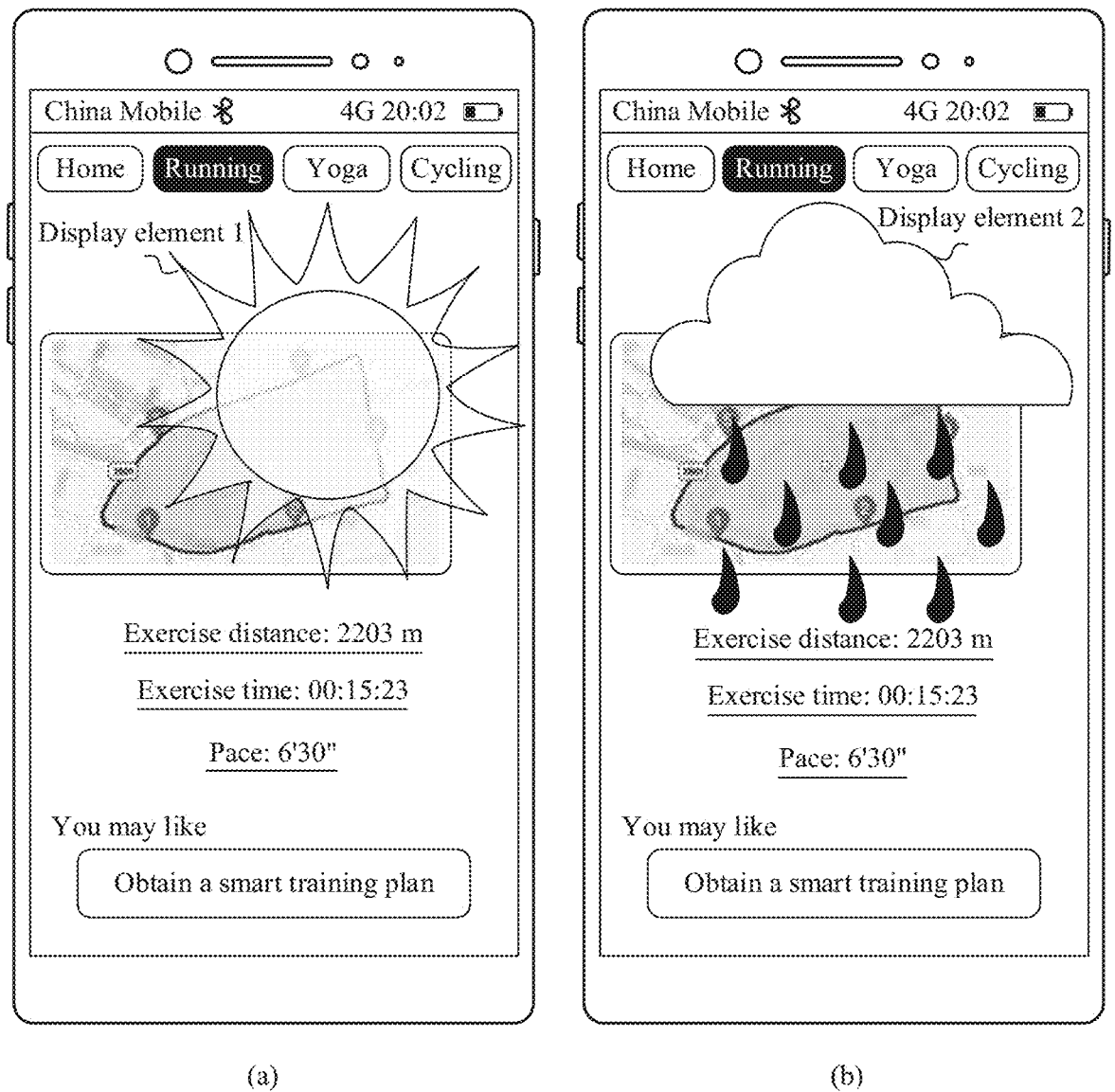
FIG. 14 is a schematic diagram 10 of a scenario of a recommendation method based on an exercise status of a user according to an embodiment of this application.

Further, when displaying the recommended content in the interface of the exercise app, the mobile phone may also display the recommended content by using different display effects according to the current exercise scenario. That the foregoing recommended content is weather information is used as an example. As shown in FIG. 14(a), if the current weather information is a sunny day when displaying the running interface, the mobile phone may set an interface background to a display element 1 corresponding to the sunny day. Correspondingly, as shown in FIG. 14(b), if the current weather information is a rainy day, when displaying the running interface, the mobile phone may set the interface background to a display element 2 corresponding to the rainy day. In this way, in different exercise scenarios, the mobile phone may display the determined recommended content to the user in different interaction manners, so as to improve human-computer interaction friendliness.

Figure 15:
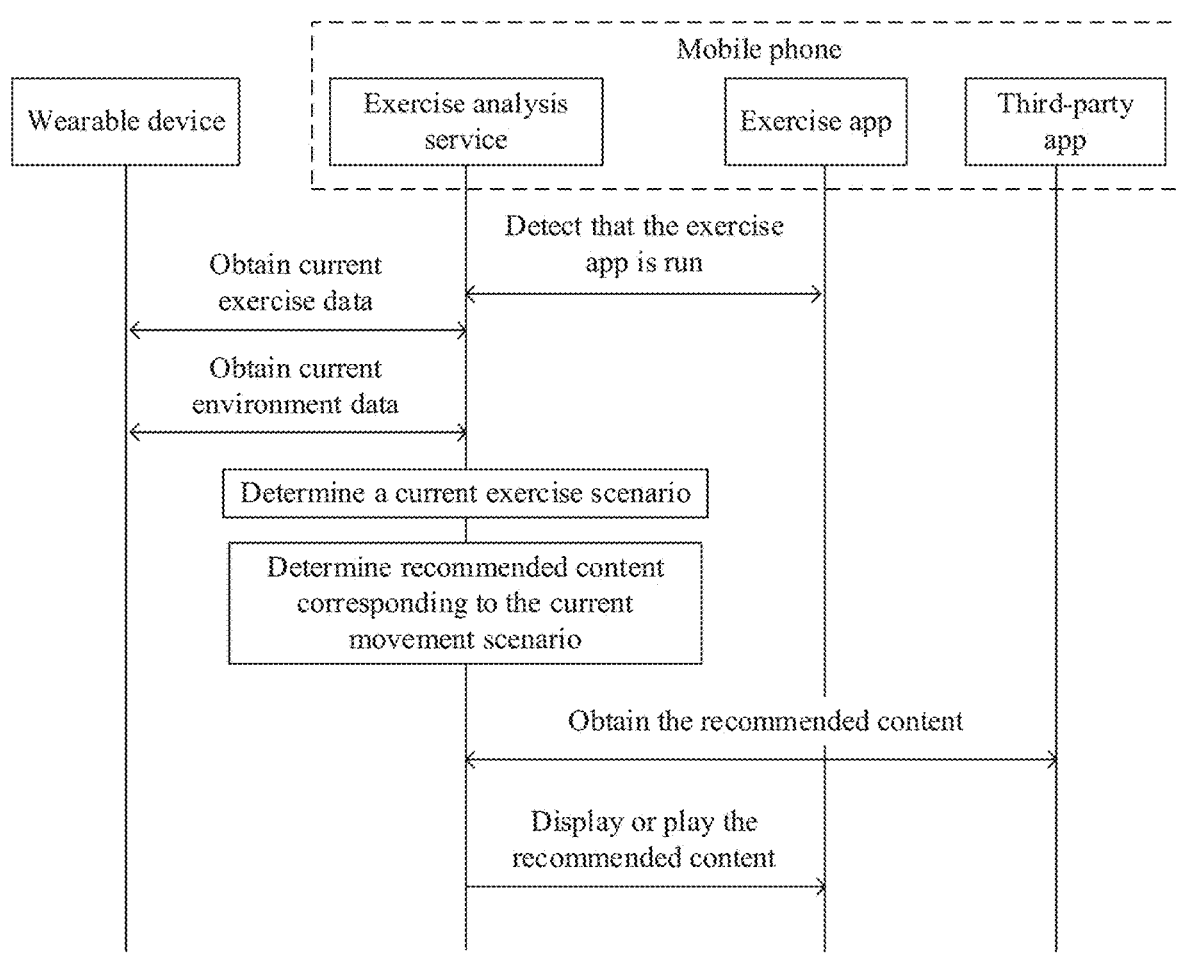
FIG. 15 is a schematic interaction diagram 2 of a recommendation method based on an exercise status of a user according to an embodiment of this application.

For example, when the user wears the wearable device to do exercise, related service content is recommended to the user. As shown in FIG. 15, an exercise analysis service in a mobile phone may detect a running status of an exercise app in real time. If the exercise analysis service detects that the exercise app starts to be run, the mobile phone may obtain current exercise data and environment data from the wearable device, and determine, based on the exercise data and the environment data, a specific exercise scenario in which the user is currently located. For descriptions of obtaining the exercise data and the environment data and determining the exercise scenario, refer to related descriptions of steps S401 to S403. After the current specific exercise scenario is determined, as described in step S404, the exercise analysis service may determine, based on the correspondence that is between the exercise scenario and the recommended content and that is shown in Table 4, recommended content that matches the current exercise scenario. Further, the exercise analysis service may obtain the recommended content from a corresponding third-party app. For example, the exercise analysis service may obtain the recommended content from the third-party app based on a URL of the recommended content. Further, the exercise analysis service may display the recommended content or play the recommended content in a display interface of the exercise app to the user.

In some embodiments, when displaying the recommended content in the interface of the exercise app, the mobile phone may use the recommended content as an internal display element of the exercise app to construct an interface layout of the exercise app. For example, after obtaining, by performing steps S401 to S404, the recommended content corresponding to the current exercise scenario, the exercise analysis service in the mobile phone may transfer the recommended content to the exercise app at an application layer. The exercise app may divide the display interface into a variable area and a fixed area in advance. The variable area is used to display the recommended content related to the current exercise scenario, and the displayed content in the variable area may change with the current exercise scenario or a use habit of the user. The fixed area may be used to display a display element preset in the exercise app, and a display element in the fixed area generally does not change. As shown in FIG. 8, the exercise app may preset an area A in an entire interface as the variable area, and set another part in the interface as the fixed area. In this case, after obtaining the recommended content 702 to 704, the exercise app may display the recommended content 702 to 704 in the area A.

In some other embodiments, the mobile phone may further set an independent application (for example, a recommendation app) to display the foregoing recommended content. The recommendation app may be, for example, a system-level application. When the exercise app is run, the recommendation app may display, in the interface of the exercise app, the recommended content obtained by the exercise analysis service. For example, as shown in FIG. 9, after obtaining the recommended content 803 corresponding to the indoor yogan exercise scenario, the exercise analysis service may transfer the recommended content 803 to the recommendation app at the application layer. The recommendation app may display the recommended content 803 in a floating window in the yoga interface 801 of the exercise app. The user can drag the floating window to change a position of the recommended content in the current interface. In addition, after playing of the recommended content in the floating window is finished, the mobile phone may automatically hide the floating window, to avoid blocking the displayed content in the interface of the exercise app. Alternatively, as shown in FIG. 10, after the recommendation app obtains the recommended content 902 and the recommended content 903 that correspond to the exercise scenario of running on the treadmill, the recommendation app may display the recommended content 902 and the recommended content 903 in a card, a floating window, or the like in a blank position in the running interface 901. Alternatively, the recommendation app may further negotiate with the exercise app by using the exercise analysis service about how to display the foregoing recommended content. For example, the recommendation app may request the exercise app to reserve display positions for the recommended content 902 and the recommended content 903. The exercise app may arrange each display element in the exercise app based on the request of the recommendation app, and send information about the display positions reserved for the recommended content 902 and the recommended content 903 to the recommendation app. In this way, the recommendation app may display the recommended content 902 and the recommended content 903 in the corresponding positions in the display interface of the exercise app based on the information about the display positions sent by the exercise app. This is not limited in this embodiment of this application.

Figure 16:
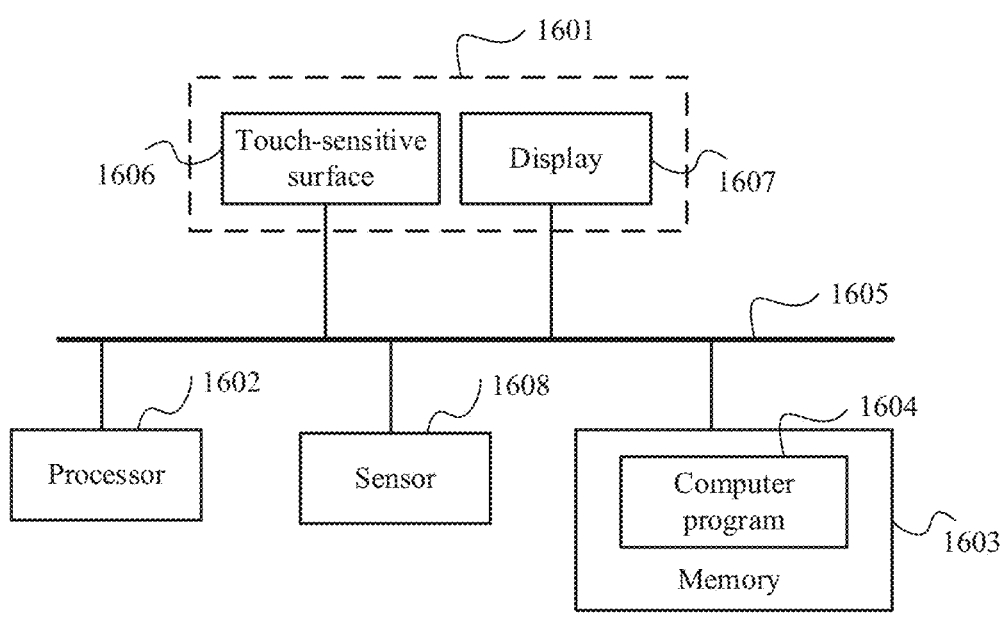
FIG. 16 is a schematic structural diagram 2 of an electronic device according to an embodiment of this application.

As shown in FIG. 16, an embodiment of this application discloses an electronic device, including: a touchscreen 1601, where the touchscreen 1601 includes a touch-sensitive surface 1606 and a display 1607; one or more processors 1602; a memory 1603; one or more sensors 1608; one or more application programs (not shown); and one or more computer programs 1604. The foregoing components may be connected by using one or more communications buses 1605. The one or more computer programs 1604 are stored in the memory 1603 and are executed by the one or more processors 1602. The one or more computer programs 1604 include an instruction, and the instruction may be used to perform the steps in the corresponding embodiments.

For example, the processor 1602 may be specifically the processor 110 shown in FIG. 1. The memory 1603 may be specifically the internal memory 121 and/or the external memory 120 shown in FIG. 1. The display 1607 may be specifically the display 194 shown in FIG. 1. The sensor 1608 may be specifically one or more sensors in the sensor module 180 shown in FIG. 1. The touch-sensitive surface 1606 may be specifically the touch sensor 180K in the sensor module 180 shown in FIG. 1. This is not limited in this embodiment of this application.

In some embodiments, this application further provides a graphical user interface (GUI). The graphical user interface may be stored in an electronic device. For example, the electronic device may be the electronic device shown in FIG. 1 or FIG. 16.

When the electronic device is in a first exercise scenario, the graphical user interface may include a first GUI displayed on the touchscreen. The first GUI may be a first display interface of an exercise app, and the first display interface includes first recommended content corresponding to the first exercise scenario. For example, when the electronic device detects that a current exercise scenario is a running scenario, as shown in FIG. 8, the electronic device may display the running interface 701 of the exercise app, where the running interface 701 includes the recommended content 702 to 704 determined by the electronic device. The recommended content 702 to 704 is related to the current exercise scenario (namely, the running scenario). Further, the recommended content 702 to 704 may be generated based on a historical use habit of a user in the running scenario.

When the electronic device is in a second exercise scenario, the graphical user interface may include a second GUI displayed on the touchscreen. The second GUI may be a second display interface of the exercise app, and the second display interface includes second recommended content corresponding to the second exercise scenario. For example, when the electronic device detects that the current exercise scenario is a yoga scenario, as shown in FIG. 9, the electronic device may display the yoga interface 801 of the exercise app, where the yoga interface 801 includes the recommended content 802 to 803 determined by the electronic device. The recommended content 802 to 803 is related to the current exercise scenario (namely, the yoga scenario). Further, the recommended content 802 to 803 may also be generated based on a historical use habit of the user in the yoga scenario.

The foregoing descriptions about implementations allow a person skilled in the art to clearly understand that, for the purpose of convenient and brief description, division into only the foregoing function modules is used as an example for description. In an actual application, the foregoing functions can be allocated to different function modules for implementation based on a requirement. In other words, an inner structure of an apparatus is divided into different function modules to implement all or some of the functions described above. For a detailed working process of the foregoing system, apparatus, and unit, refer to a corresponding process in the foregoing method embodiments, and details are not described herein again.

Function units in the embodiments of this application may be integrated into one processing unit, or each of the units may exist alone physically, or two or more units may be integrated into one unit. The integrated unit nay be implemented in a form of hardware, or may be implemented in a form of a software functional unit.

When the integrated unit is implemented in the form of a software function unit and sold or used as an independent product, the integrated unit may be stored in a computer-readable storage medium. Based on such an understanding, the technical solutions of the embodiments of this application essentially, or the part contributing to the prior art, or all or some of the technical solutions may be implemented in a form of a software product. The computer software product is stored in a storage medium and includes several instructions for instructing a computer device (which may be a personal computer, a server, or a network device) or a processor to perform all or some of the steps of the methods described in the embodiments of this application. The foregoing storage medium includes: any medium that can store program code, such as a flash memory, a removable hard disk, a read-only memory, a random access memory, a magnetic disk, or a compact disc.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A recommendation method based on an exercise status of a user and implemented by an electronic device, the recommendation method comprising:
   obtaining first exercise data of the user after running an exercise application, wherein the first exercise data reflects a type of exercise performed by the user;
   obtaining, using a sensor, an external environment feature of the electronic device during the exercise, wherein the external environment feature comprises one or more of ambient light intensity, humidity, a wind scale, or a geographical location;
   obtaining current first environment data that reflects the external environment feature;
   obtaining, from a third-party application, a first recommended content corresponding to a first exercise scenario based on a historical use habit of the user in the first exercise scenario, wherein the first exercise scenario corresponds to the first exercise data and the current first environment data, and wherein the historical use habit is based on a plurality of previous exercise scenarios; and
   either displaying the first recommended content in a display interface of the exercise application or playing the first recommended content when running the exercise application.

2. The recommendation method of claim 1, wherein the type of the exercise is based on the first exercise data.

3. The recommendation method of claim 1, further comprising:
   storing a correspondence between different exercise scenarios and different recommended content; and
   querying the correspondence for the first recommended content corresponding to the first exercise scenario.

4. The recommendation method of claim 1, further comprising:
   displaying detailed information of the first recommended content in the display interface; or
   displaying a shortcut of the first recommended content in the display interface.

5. The recommendation method of claim 4, wherein after displaying the shortcut, the recommendation method further comprises:
   detecting that the user selects the shortcut; and
   responsive to detecting that the user selects the shortcut, either displaying the detailed information in the display interface or playing the detailed information.

6. The recommendation method of claim 1, further comprising:
   receiving, while running the exercise application, a preset gesture from the user; and
   starting to play the first recommended content responsive to receiving the preset gesture.

7. The recommendation method of claim 1, wherein whether to display the first recommended content in the display interface or to play the first recommended content when running the exercise application is based on the first exercise scenario.

8. The recommendation method of claim 1, further comprising:
   obtaining second exercise data of the user when running the exercise application;
   obtaining second recommended content corresponding to a second exercise scenario, wherein the second exercise scenario corresponds to the second exercise data, wherein the second exercise scenario is different than the first exercise scenario, and wherein the second recommended content is different than the first recommended content; and
   displaying the second recommended content in the display interface or playing the second recommended content when running the exercise application.

9. The recommendation method of claim 1, wherein the first recommended content comprises one or more of an audio file, a video file, fitness and health information, or environment information.

10. An electronic device, comprising:
    a display;
    one or more sensors;
    a memory; and one or more processors coupled to the display, the one or more sensors, and the memory, and configured to cause the electronic device to:
- obtain, using the one or more sensors, first exercise data of a user after running an exercise application, wherein the first exercise data reflects a type of exercise performed by the user;
- obtain, using the one or more sensors, an external environment feature of the electronic device during the exercise, wherein the external environment feature comprises one or more of ambient light intensity, humidity, a wind scale, or a geographical location;
- obtain, using the one or more sensors, current first environment data that reflects the external environment feature;
- obtain, from a third-party application, a first recommended content corresponding to a first exercise scenario based on a historical use habit of the user in the first exercise scenario, wherein the first exercise scenario corresponds to the first exercise data and the current first environment data, and wherein the historical use habit is based on a plurality of previous exercise scenarios; and
- either display, using the display, the first recommended content in a display interface of the exercise application or play the first recommended content when running the exercise application.

11. The electronic device of claim 10, wherein the type of the exercise is based on the first exercise data.

12. The electronic device of claim 10, wherein the memory is configured to store a correspondence between different exercise scenarios and different recommended content, and wherein the one or more processors are further configured to cause the electronic device to query the correspondence for the first recommended content corresponding to the first exercise scenario.

13. The electronic device of claim 10, wherein the one or more processors are further configured to cause the electronic device to:
display, using the display, detailed information of the first recommended content in the display interface of the exercise application; or display, using the display, a shortcut of the first recommended content in the display interface of the exercise application.

14. The electronic device of claim 13, wherein the electronic device further comprises a touchscreen that comprises the display, and wherein after the electronic device displays the shortcut, the one or more processors are further configured to cause the electronic device to:
detect, using the touchscreen, that the user selects the shortcut; and
responsive to detecting that the user selects the shortcut, either display, using the display, the detailed information in the display interface or play the detailed information.

15. The electronic device of claim 10, wherein the electronic device further comprises a touchscreen that comprises the display, and wherein the one or more processors are further configured to cause the electronic device to:
receive, while running the exercise application and via the touchscreen, a preset gesture from the user; and
start to play the first recommended content responsive to receiving the preset gesture.

16. The electronic device of claim 10, wherein whether to display the first recommended content in the display interface or to play the first recommended content when running the exercise application is based on the first exercise scenario.

17. The electronic device of claim 10, wherein the one or more processors are further configured to cause the electronic device to:
obtain second exercise data of the user when running the exercise application;
obtain second recommended content corresponding to a second exercise scenario, wherein the second exercise scenario corresponds to the second exercise data, wherein the second exercise scenario is different than the first exercise scenario wherein the second recommended content is different than the first recommended content; and
either display, using the display, the second recommended content in the display interface or play the second recommended content when running the exercise application.

18. An electronic device, comprising:
a touchscreen;
one or more sensors;
a memory configured to store one or more computer programs; and
a processor coupled to the touchscreen and the memory and configured to execute the one or more computer programs to cause the electronic device to:
- display a first graphical user interface (GUI) on the touchscreen when the electronic device is in a first exercise scenario, wherein the first GUI is a first display interface of an exercise application, wherein first recommended content is based on a first historical use habit of a user in the first exercise scenario, wherein the first historical use habit is based on a plurality of previous first exercise scenarios, and wherein the first display interface comprises the first recommended content corresponding to the first exercise scenario;
- obtain, using the one or more sensors, current first environment data that reflects an external environment feature of the electronic device during the first exercise scenario, wherein the external environment feature comprises one or more of ambient light intensity, humidity, a wind scale, or a geographical location; and
- display a second GUI on the touchscreen when the electronic device is in a second exercise scenario that is different than the first exercise scenario, wherein the second GUI is a second display interface of the exercise application, wherein second recommended content is based on the current first environment data and based on a second historical use habit of the user in the second exercise scenario, wherein the second historical use habit is based on a plurality of previous second exercise scenarios, and wherein the second display interface comprises the second recommended content that corresponds to the second exercise scenario and that is different than the first recommended content.

19. The electronic device of claim 10, wherein the first recommended content comprises one or more of an audio file, a video file, fitness and health information, or environment information.

* * * * *